United States Patent [19]

Urabe et al.

[11] Patent Number: 5,261,065
[45] Date of Patent: Nov. 9, 1993

[54] INPUT/OUTPUT PROCESSING METHOD IN A DATABASE MANAGEMENT SYSTEM

[75] Inventors: Shoo Urabe, Kawasaki; Masashi Tsuchida, Shibuya; Hideo Mutoh, Yokohama; Yukio Nakano, Yokohama; Toshio Honma, Yokohama; Kiyoshi Yata, Hadano; Hiroyuki Kitajima, Yokohama; Tadashi Ohsone, Yokohama; Nobuhiro Taniquchi, Hadano, all of Japan

[73] Assignees: Hitachi, Ltd.; Hitachi Microcomputer Engineering Ltd., both of Tokyo; Hitachi Software Engineering Co., Ltd., Yokohama, all of Japan

[21] Appl. No.: 491,235

[22] Filed: Mar. 9, 1990

[30] Foreign Application Priority Data

Mar. 10, 1989 [JP] Japan .................................. 1-56460

[51] Int. Cl.⁵ .................. G06F 15/40; G06F 12/00
[52] U.S. Cl. .................................. 395/425; 395/600; 364/DIG. 1; 364/254; 364/254.3; 364/238.4; 364/270.5; 364/270.6; 364/282.1; 364/283.4
[58] Field of Search .................... 395/600, 425, 275

[56] References Cited

U.S. PATENT DOCUMENTS

| | | | |
|---|---|---|---|
| 4,509,119 | 4/1985 | Gumaer et al. | 395/250 |
| 4,620,295 | 10/1986 | Aiken, Jr. | 364/419 |
| 4,633,387 | 12/1986 | Hartung et al. | 395/650 |
| 4,714,989 | 12/1987 | Billings | 395/600 |
| 4,750,106 | 6/1988 | Aiken, Jr. | 395/575 |
| 4,771,375 | 9/1988 | Beglin et al. | 395/425 |
| 5,018,060 | 5/1991 | Gelb et al. | 395/600 |
| 5,127,094 | 6/1992 | Bono | 395/400 |
| 5,146,561 | 9/1992 | Carey et al. | 395/600 X |

*Primary Examiner*—Paul V. Kulik
*Attorney, Agent, or Firm*—Fay, Sharpe, Beall, Fagan, Minnich & McKee

[57] ABSTRACT

With respect to input/output requests; a microprogram controls collection of data according to the data format; data accessing divides the requests for every recording medium and performs asynchronous processing; an on-line process is carried out in view of the processing priority order of the requests; parallel accessing sets requests for each medium; buffer control assures a block buffer and a page address list before receiving requests; data accessing sets a list of CCHHR codes in response to a continuous characteristic of the stored state in the recording medium; and mode deciding judges the two data transfer modes, a page search mode and a data search mode, in response to the requests.

19 Claims, 27 Drawing Sheets

| | ON-LINE PROCESSING | BATCH PROCESSING |
|---|---|---|
| PAGE SELECTION | NUMBER OF BLOCKS IN PAGE ADDRESS | 1/2 NUMBER OF BLOCKS |
| RECORD SELECTION | 1/2 NUMBER OF BLOCKS | 1/10 NUMBER OF BLOCKS |

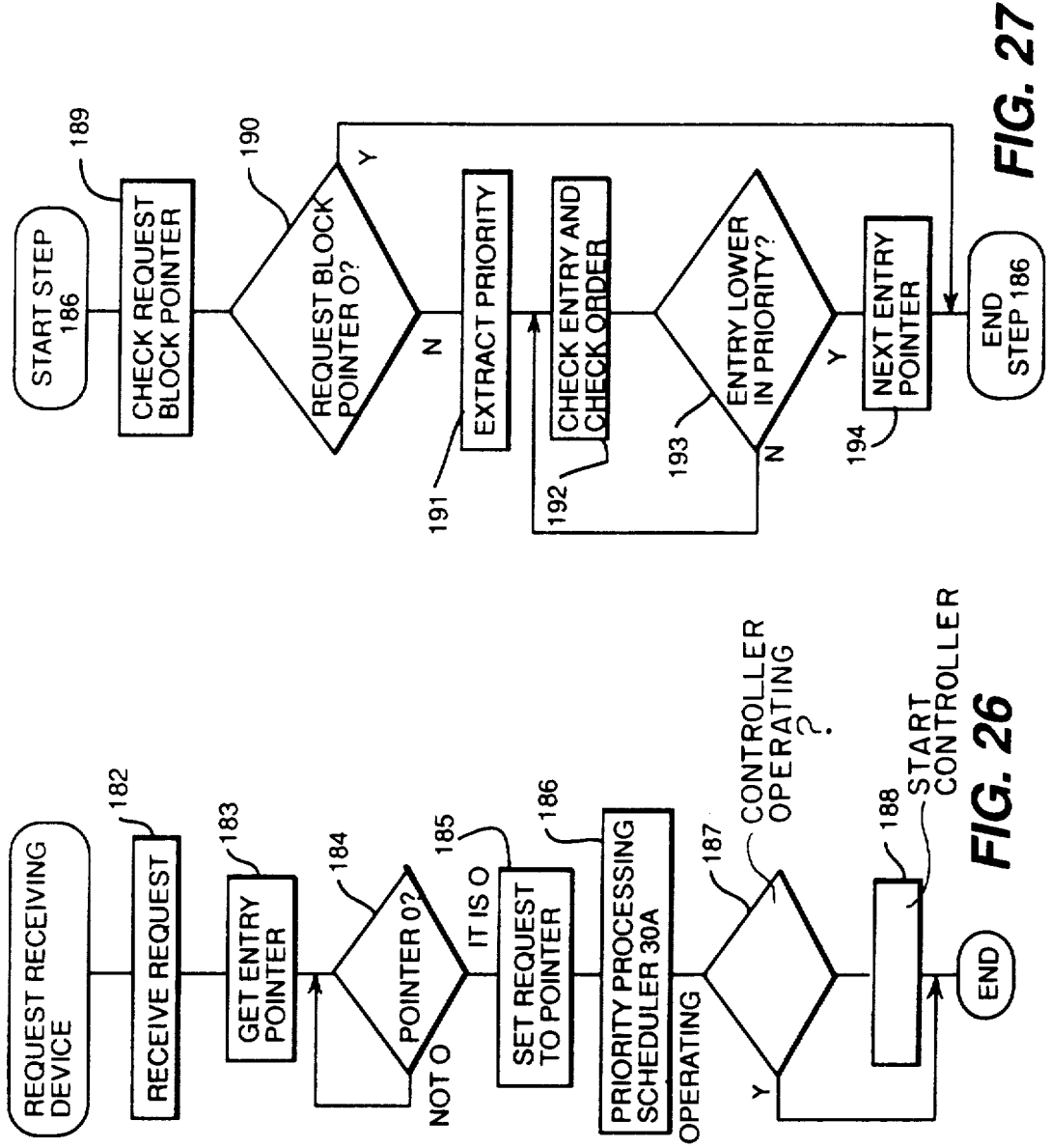

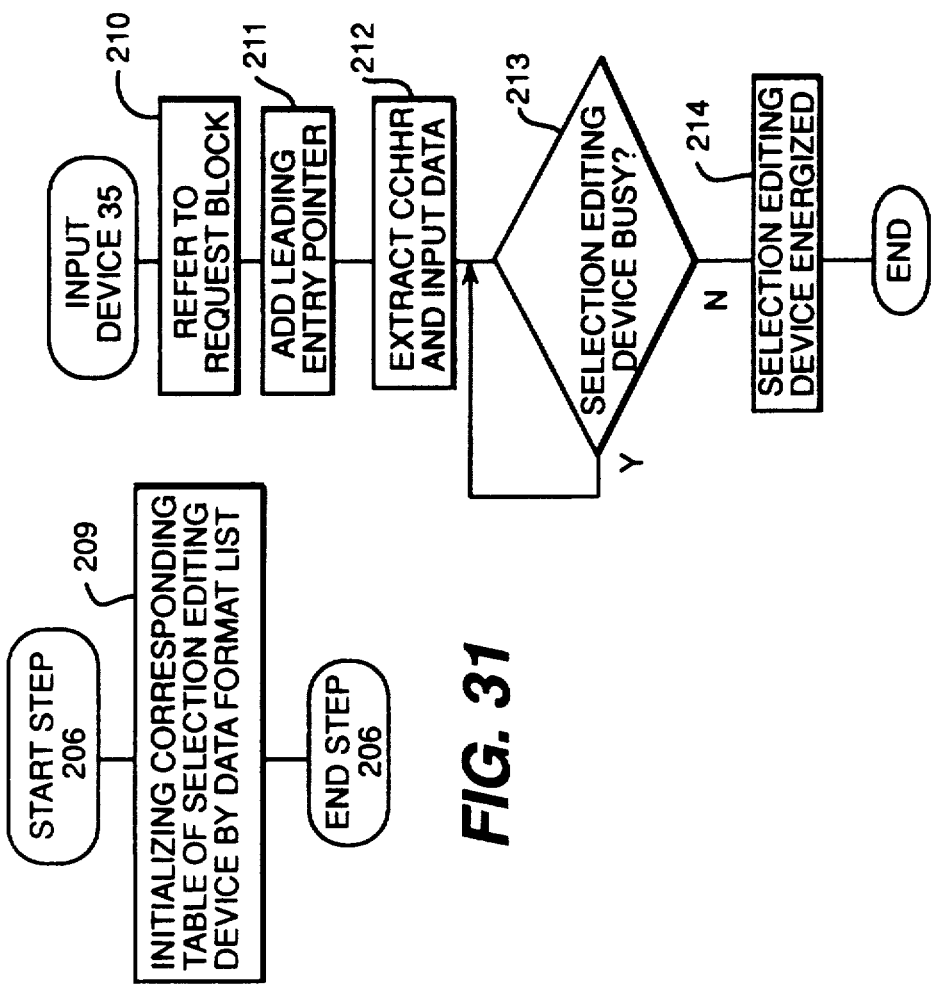
FIG. 31
FIG. 32
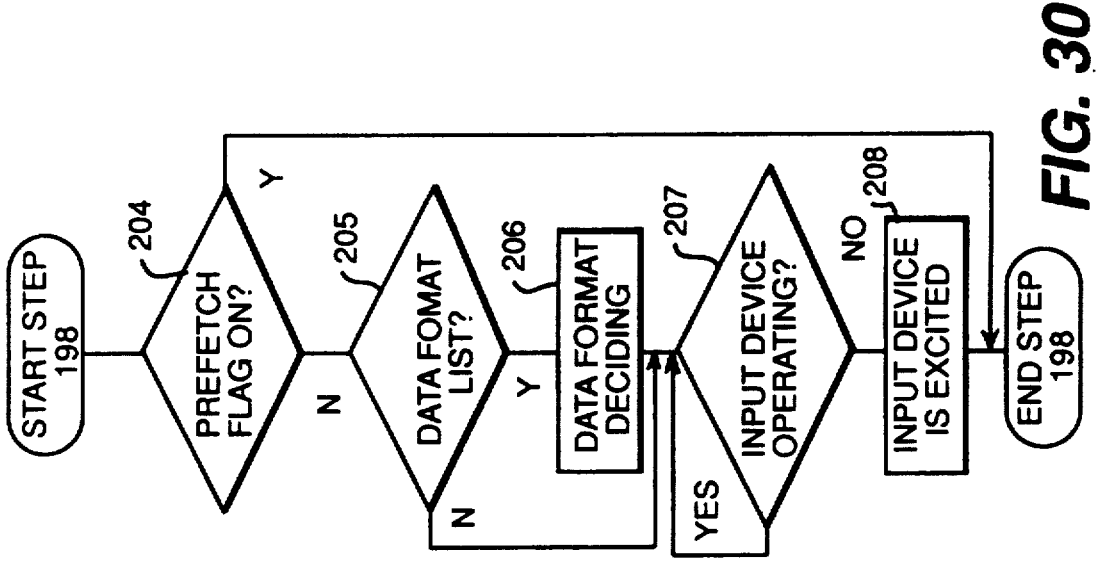
FIG. 30

INPUT/OUTPUT PROCESSING METHOD IN A DATABASE MANAGEMENT SYSTEM

BACKGROUND

This invention relates to input/output processing, and more particularly input/output processing for performing retrieving, comparing calculation and collective calculation in a data base management system (hereinafter called as DBMS) in synchronism with a data transmitting operation.

For a user program to perform input/output requests, it must perform a concurrence control over the data before inputting the data from a recording medium. It must also assure that a buffer exists. If the data is distributed over a plurality of recording medium, the user program divides the requests for each recording medium and utilizes an accessing process, corresponding to a data format, to carry out the input/output operation. The accessing process outputs all requests for inputting a plurality of addresses of the data input requests. The data processing device processes the data in the order the requests are received. Then the user program carries out a data calculation for the received data.

SUMMARY

The above-mentioned prior art has the following problems:.

(1) In the conventional type of data control, there is a certain restriction for data having different data formats such as a sequential data set, partitioned organization data set and a direct organization data set. Thus, the program issues the request upon recognizing the data format. Due to this fact, the program for performing an input/output of data depends upon the data format of the data and has no flexibility for processing variations of the dataset format.

(2) The input/output control device of the prior art, for performing an input/output of the data under control of the recording medium, may receive a plurality of input/output requests and does not process them in an asynchronous manner.

(3) The prior art input/output control device does not perform processing by priority of input/output requests, when input/output requests are generated.

(4) The prior art input/output control device performed a prefetching into a cache memory for each of the tracks, so there is no need to show that this system can perform a prefetching operation for data not required.

(5) In the prior art user program, if the input/output requests were applied over a plurality of recording media, it was necessary to divide the input/output requests for each recording medium in consideration of the stored state and issue the divided requests.

(6) In the prior art user program, a block of data was transferred without fail to the buffer which was prepared under request of input data, so that the received block was released when not required. However, if this data processing device is used, it is needed to know the buffer not receiving any data in the receiving buffer due to the fact that the receiving block is not definitely defined.

(7) In the prior art input/output control device, it is possible to eliminate a head positioning action and a waiting operation for a rotation of the head, except during the initial block inputting operation, when a continuous block is to be inputted. However, the prior art data control performs the position setting and the waiting for rotation for every block without considering any continuity of the physical positions of these blocks on the recording medium. Thus the data transferring time is extended.

(8) The prior art input/output control device performed a data input/output operation for every block unit. However, since the data processing device supports two modes, a block search mode and a data search mode, it is desirable to separately use these two modes and to reduce the amount of data transferred.

It is an object of this invention to provide an input/output processing method for eliminating such problems as found in the prior art.

In order to accomplish such objects as mentioned above, this invention has the features and functions described below.

(1) A microprogram control function for controlling a program code, includes an access program for the collection of data according to the data format. It also includes a data format deciding function which enables the data processing device to perform the data processing operation for data of the recording medium having different data formats, by receiving the program code through the data accessing process. The microprogram control function in the data accessing process transfers the program code, having an accessing procedure as described, for collecting data according to the data format in the recording medium, from the calculation device to the data processing device. The data format deciding part of the data processing device may process data, even from another recording medium having a different data format, by receiving the program code. Thus, the program performs a more efficient concurrence control over the received data content by the mis-hit page address list.

(2) An asynchronous processing function of the data processing device receives, simultaneously, a plurality of input/output requests and processes them asynchronously. Thus the program does not need to know that the data is separately stored in a plurality of recording medium. The data accessing process divides the requests for every recording medium, issues the input/output requests and performs asynchronous processing. This asynchronous processing shortens input/output time.

(3) A priority order deciding function can be used when it is desired that a program be preferentially processed such as when a data request in an on-line process is carried out in view of the processing priority order of the input/output requests from the data accessing process.

(4) A prefetch processing function is capable of stopping a data transfer for the calculation device, continuing a data calculation for the remaining page addresses asynchronously with a data calculation within the calculation device in case that the data buffer within the calculation device is full before completing a retrieval of all the data groups of the page addresses in the data processing device. The prefetch processing function stores in a cache a result of input/output requests in a buffer of the data processing device and transfers data from within the buffer when the data transfer requests from the calculation device are accepted. A prefetch deciding function allows the data accessing process to divide the list of CCHHR codes from the program depending on the size of the data buffer and perform a prefetching request.

The prefetch deciding function of the data accessing process can consider the frequency of the input/output requests for the data processing device and their priority. If the frequency is low or the priority order is high, the prefetch deciding function can output a prefetch request to the data processing device. Thus only the required data is processed (i.e., no useless operation is performed).

(5) In a parallel access deciding function, the data accessing process causes the input/output requests to be set for each recording medium and transfers these requests to the data processing device. Then it processes each of the input/output requests asynchronously, collects a result of each of the input/output requests and transfers this result to the calculation device after completion of the input/output requests for each recording medium. The parallel access deciding function of the data access process sets the input/output requests for each recording medium if those requests are for the data stored in a plurality of groups of recording medium. Each of the input/output requests is processed asynchronously. After completion of the input/output requests for each recording medium, the result is transferred to the calculation device. Thus, the program need not know the stored state of the data.

(6) A buffer control function, of the program, assures a block buffer and a buffer for a mis-hit page address list before receiving input/output requests. Upon completion of the calculation, the buffer control function may release the unnecessary block buffer by referring to information within the mis-hit page address list.

(7) The data accessing process sets a list of CCHHR codes in response to a continuous characteristic of the stored state in the recording medium. If the CCHHR codes are continuous, the data may be read efficiently. Thus, it is possible to eliminate head positioning and reduce rotation waiting time.

(8) A mode deciding function allows the program to judge the two data transfer modes, a page search mode and a data search mode, in response to the input/output requests and then perform the request for calculation. It judges the mode according to the type of operation for input/output requests and a common characteristic of data within the input/output requests. Also, it issues the input/output requests to the data processing device, so that if it is unnecessary to receive any block, the amount of transferred data can be reduced.

BRIEF DESCRIPTION OF THE DRAWINGS

Further objects, features and advantages of the present invention will become more clear upon the following detailed description of preferred embodiments as shown in the drawing, wherein:

FIG. 26 is a flow chart of the request receiving device control;

FIG. 27 is a flow chart of the step 186 of FIG. 26;

FIG. 30 is a flow chart of the step 198 of FIG. 28;

FIG. 31 is a flow chart of the step 206 of FIG. 30;

FIG. 32 is a flow chart of the input device control;

DETAILED DESCRIPTION

Figure 1:
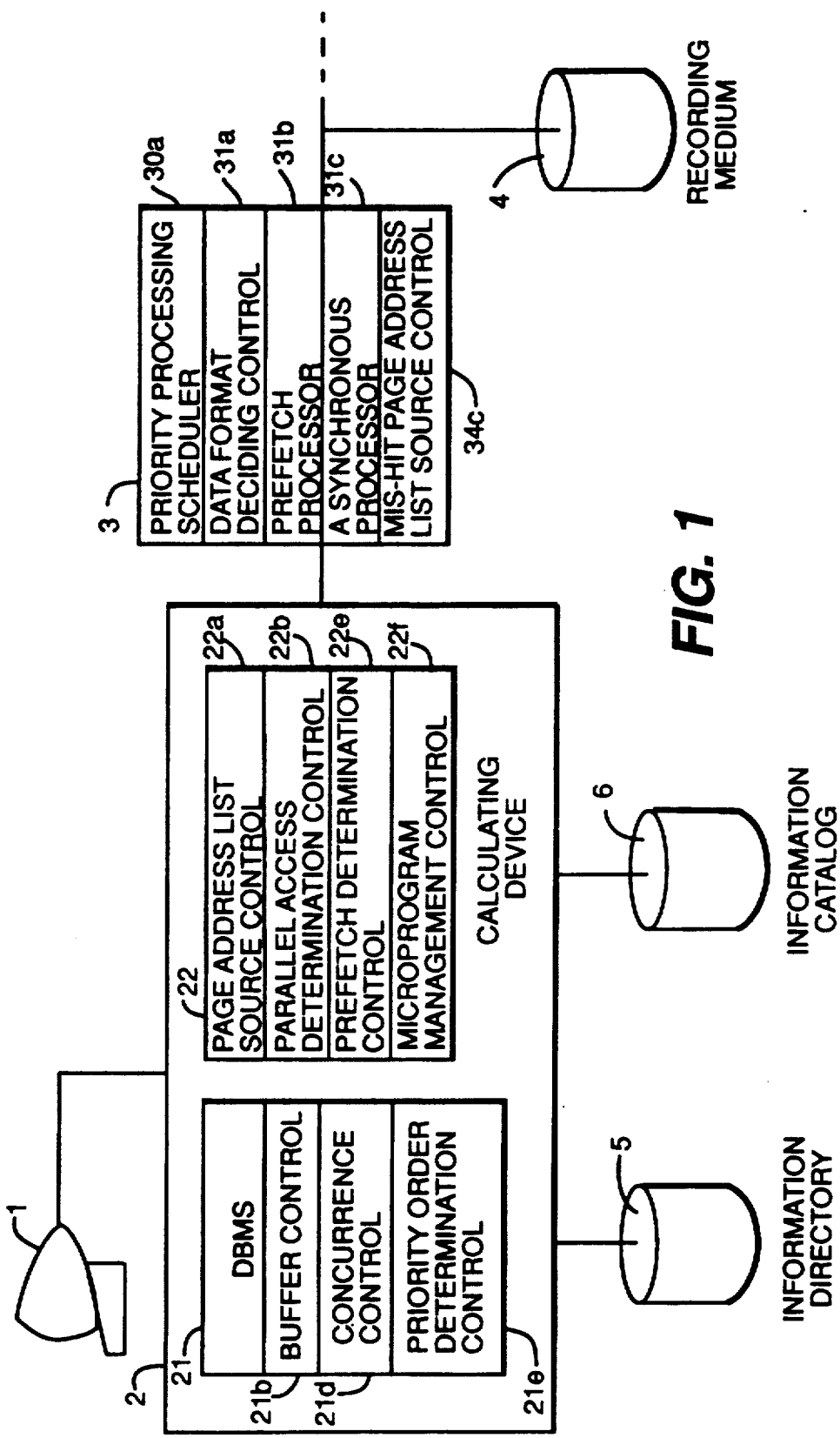
FIG. 1 is a view of a system configuration of one preferred embodiment of this invention, and a functional constitution of a DBMS, data accessing program and a data processing device.

Referring now to the drawings, one preferred embodiment of this invention will be described in detail.

FIG. 1 illustrates a system of one embodiment of this invention. In this preferred embodiment, the DBMS 21 is shown as a program for issuing input/output requests to the data processing device 3. At a terminal 1 a user may issue commands to the DBMS 21. The system further includes a calculation device 2 having the DBMS 21 and a data access program 22, a data processing device 3, a recording medium 4 that may be a plurality of recording mediums for storing the data base, an information directory 5 used by the DBMS 21 to control the data base, and an information catalog 6 used by the data access program 22 to control the data processing device 3. DBMS 21 is provided with a buffer control 21b, a concurrence control 21d and a priority order determination control 21e. The data access program 22 is provided with a page address list source control 22a, a parallel access determination control 22b, a prefetch determination control 22e and a microprogram determination control 22f. The data processing device 3 is provided with a priority processing scheduler 30a, a data format deciding control 31a, a prefetch processor 31b, an asynchronous processor 31c and a mis-hit page address list source control 34c.

Figure 36:
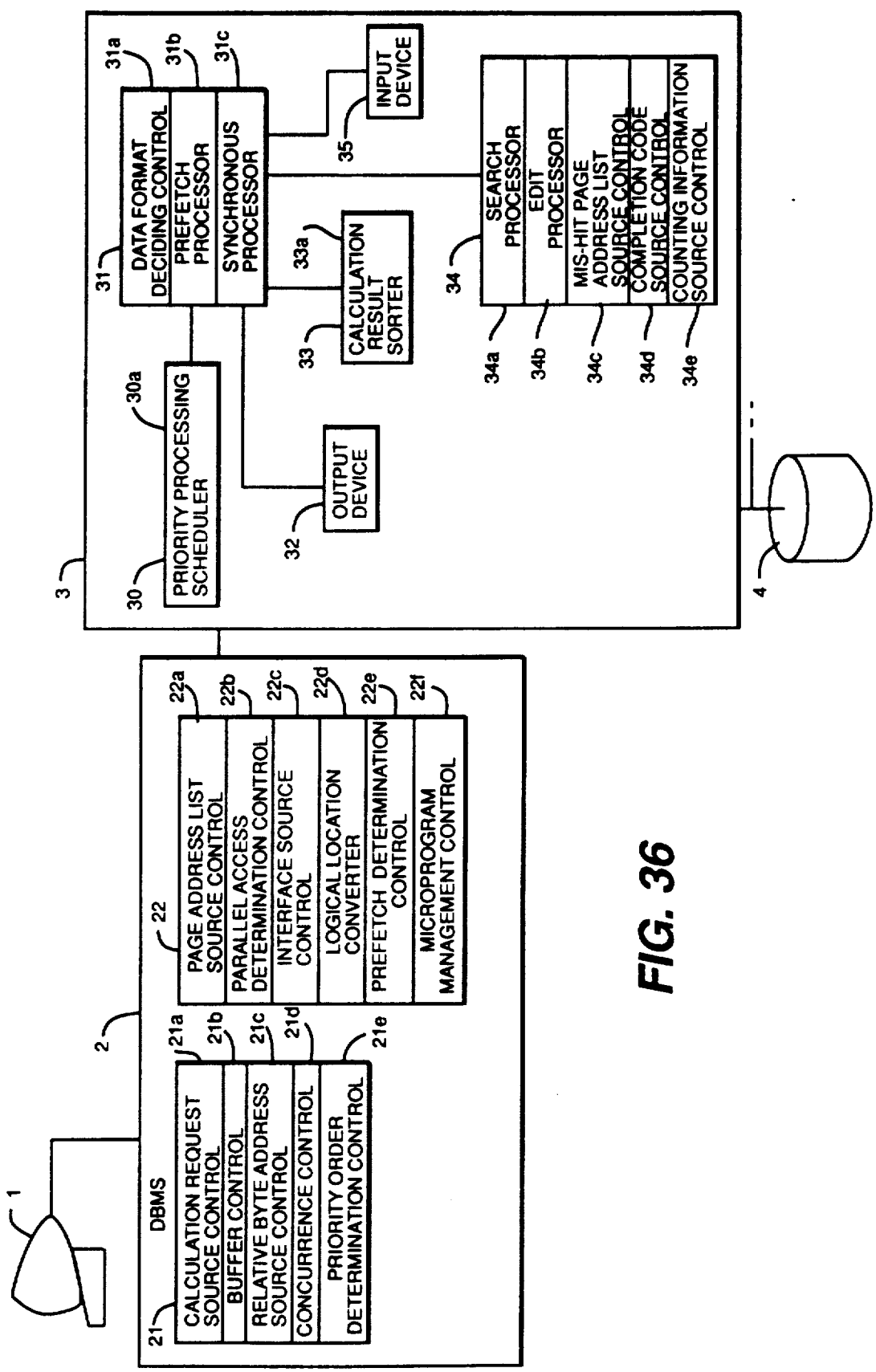
FIG. 36 illustrates further details of FIG. 1.

FIG. 36 illustrates in further detail a configuration of this system and its function. DBMS 21 is provided with calculation request source control 21a and a relative byte address source control 21c in addition to the elements described above. The data access program 22 is provided with an interface source control 22c and a logical location converter 22d in addition to the elements described above. The data processing device 3 is provided with a request receiving device 30, a control device 31, an output device 32, a sorter 33, a selection and editing device 34 and an input device 35 in addition to the elements described above. The sorter device 33 is provided with a calculation result sorter 33a. The selection and editing device 34 is provided with a search processor 34a, an edit processor 34b, a completion code source control 34d and a counting information source control 34e. The operation of each of the elements will be described later.

Figure 3:
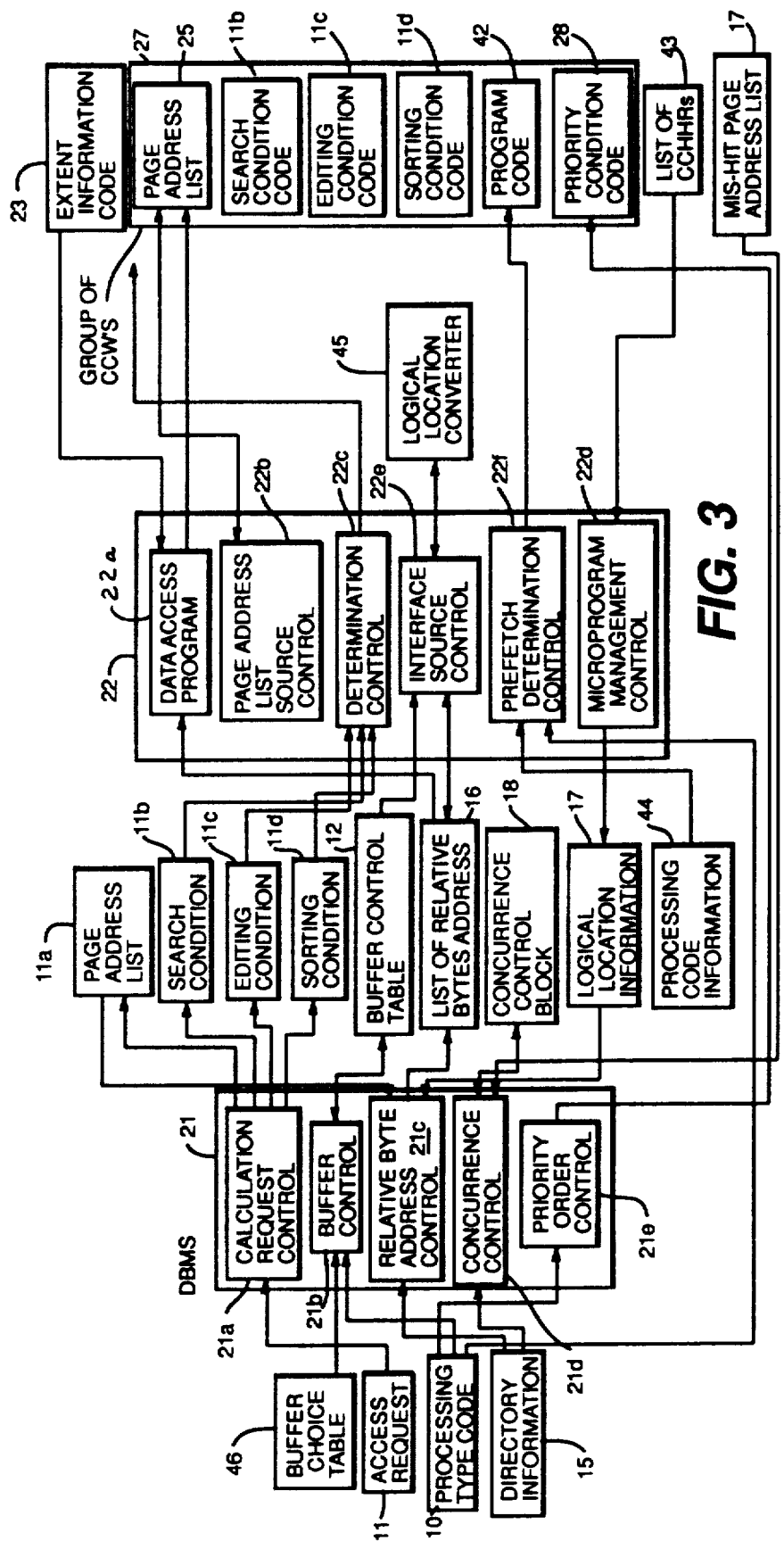
FIG. 3 is a general functional configuration of the calculation device.

FIG. 3 illustrates a general functional configuration of the calculation device 2. If a user inputs an access request 11 from terminal 1, the calculation request source control 21a in DBMS 21 analyzes the access request 11 and converts it into four codes, i.e. a page address list code 11a describing which data is accessed, that is the information of the range of access, a search condition list code 11b describing what data is selected from the collection of data accessed, an editing condition list code 11c describing which data format is applied to the searched data and a sorting condition list code 11d describing in what order the searched and edited data is outputted. Then the calculation request source control 21a transfers the codes 11b, 11c, 11d to the data access program 22.

The receiving area control, that is buffer control 21b receives the processing type code 10 indicating whether the acess request 11 is an online processing or a batch processing and receives information from a buffer choice table 46 for determining the number of buffers. This buffer control 21b reserves a buffer in buffer control table 12 for receiving a discriminating block of the mis-hit page address list 17, containing a result of data calculation in the data processing device 3, and a plurality of data groups of processed data or unit of data transfer. The buffer control 21b releases an unused buffer of buffer control table 12 after completion of the calculation result.

The relative byte address source control 21c receives the directory information 15. The relative byte address source control 21c converts the page address list code 11a into a CCHHR code as a list of relative byte addresses 16 for indicating a range of searched recording medium 4.

The list of CCHHR codes 43 indicate the logical position in reference to the directory information 15 describing a relation between the logical location information of the mis-hit page address list 17 of data collection and the physical position on the recording medium 4. After completion of the calculation result, the CCHHR may be converted code 11e in reference to the logical position code 11f sent from the data processing device 3.

The concurrence control 21d receives directory information 15, passes data to the storage of the concurrence control block 18 and receives data from the control block 18. The concurrence control 21d controls the data in reference to the mis-hit page address list 17 sent from the data processing device 3 upon completion of the calculation.

The priority order determination control 21e receives the processing type code 10 indicating whether the access request 11 is an on-line processing or in a batch processing. If the processing type code 10 indicates on-line processing, the priority order determination control 21e extends the priority order to provide the priority condition code 28.

The access request 11 is in SQL (Structured Query Language). The SQL specifies a search condition code 11b for a column of meaningful information and the minimum record during the recording of a table having a collection of data with related information for searching and editing of data, an editing condition code 11c describing the format or in what order this data of the column of the searched records is taken out, and a sorting condition code 11d describing that the searched and edited record is to be sorted by what column when outputted.

Figure 2:
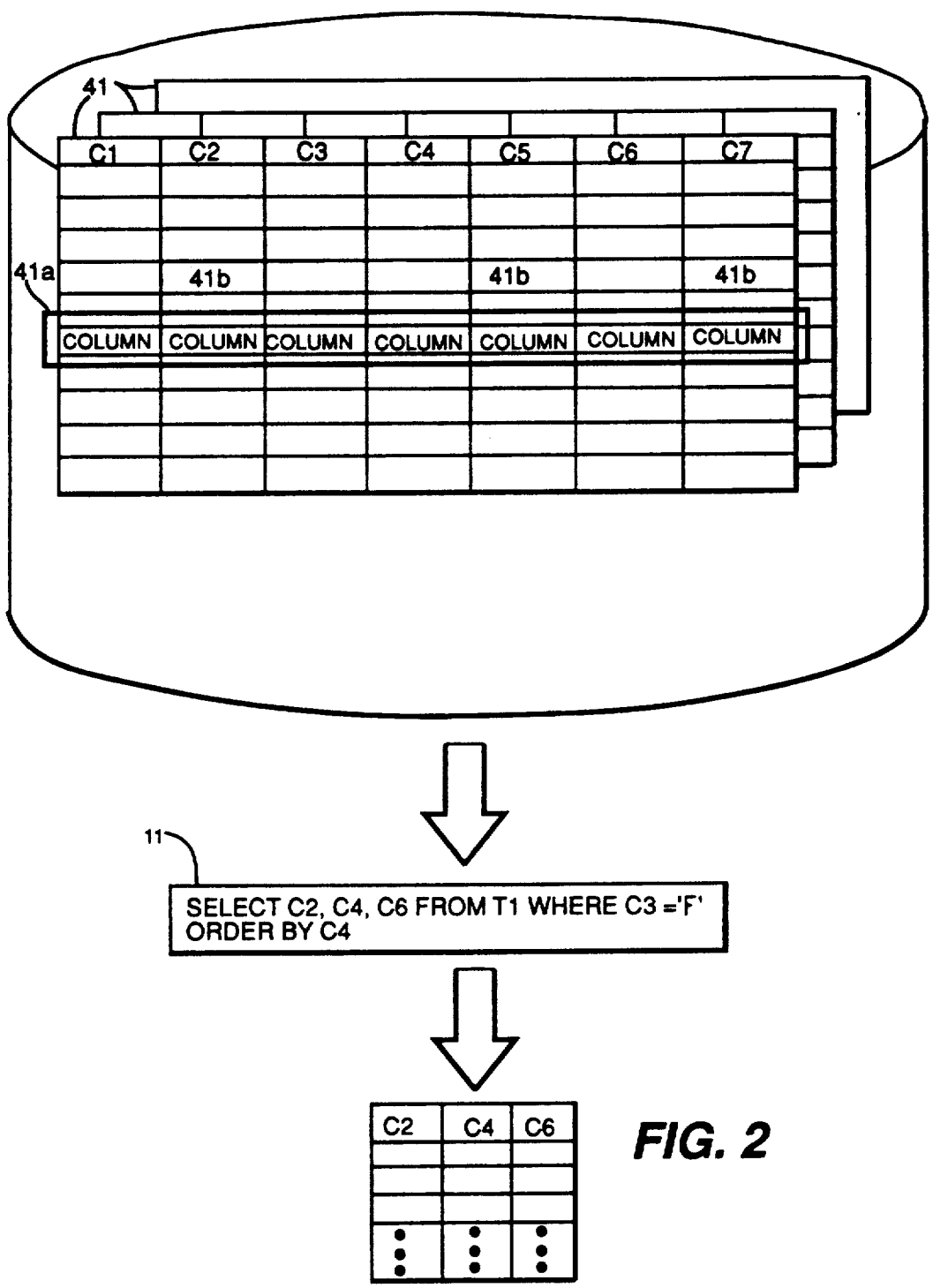
FIG. 2 is an example for showing a data storing structure and SQL (Structured Query Language)

An example, shown in FIG. 2, shows a stored condition of the data base in the recording medium 4 and the manner in which the data base is processed by SQL. The data base comprises a plurality of pages 41. The pages 41 comprise a plurality of records 41a. The records 41a have a plurality of columns 41b. In this example, according to the page address list code 11a, all the records of the table T1 are inputted. According to the search condition code 11b, a particular gender is selected in the third column C3, i.e. records having "F" for "female". According to the editing condition code 11c, the second, fourth and sixth columns C2, C4 and C6 of the selected record, i.e. columns of name, age and section are edited. The fourth column C4, age, is used for sorting according to the sorting condition code 11d. C1, C5 and C7 can represent name, address and blood type. Then, the inputted, selected, edited and sorted records are outputted.

As further shown in FIG. 3, CCHHR code control, that is the page address list source control 22a of the data access program 22, converts the list of relative byte addresses 16 from the DBMS 21 into page address list code 25, that is a list of CCHHR's, according to the input of extent information code 23 describing the mapping code between the relative byte address and the CCHHR code. The page address list is arranged in response to a continuous characteristic of the CCHHR codes.

The parallel access determination control 22b, separates the input/output requests of the page address list 25 according to each recording medium 4, when the data is recorded over a plurality of media. It then issues the input/output requests in groups for each recording medium 4 to cause the data processing device 3 to perform parallel processing. Finally, it informs the DBMS 21 when all the input/output requests for every recording medium 4 have been separated and issued, to transfer control.

The interface source control 22c generates a command for transferring, to the data processing device 3, a priority condition code 28 describing the priority order generated by DBMS 21. It also generates a program code 42 describing an access order according to the data structure, CCHHR code, the search condition code 11b, the editing condition code 11c and the sorting condition code 11d.

The logical location converter 22d receives the CCHHR codes 43 indicating the storing position of the data on the recording medium 4 and transfers the information to the mis-hit page address list 17. Lastly, data sent from the data processing device 3 and a completion code indicating that the input/output requests are completed, convert the CCHHR position of the completion code into its relative byte address which is transferred to the DBMS 21.

The prefetch determination control 22e judges the condition of the present data processing device 3 and divides the number of buffers by the number of accesses if the prefetch can not be performed. If it can be judged that the prefetch is carried out, it issues the requests as it is.

The microprogram management control 22f refers to the processing type code 10 and the processing code information 44 to provide a program code 42, corresponding to the data format, to the group of CCWs 27 by the interface source control 22c according to the type of DBMS 21.

Thus the group of CCWs 27 includes codes of 25, 11b, 11c, 11d, 42, 28.

Figure 4:
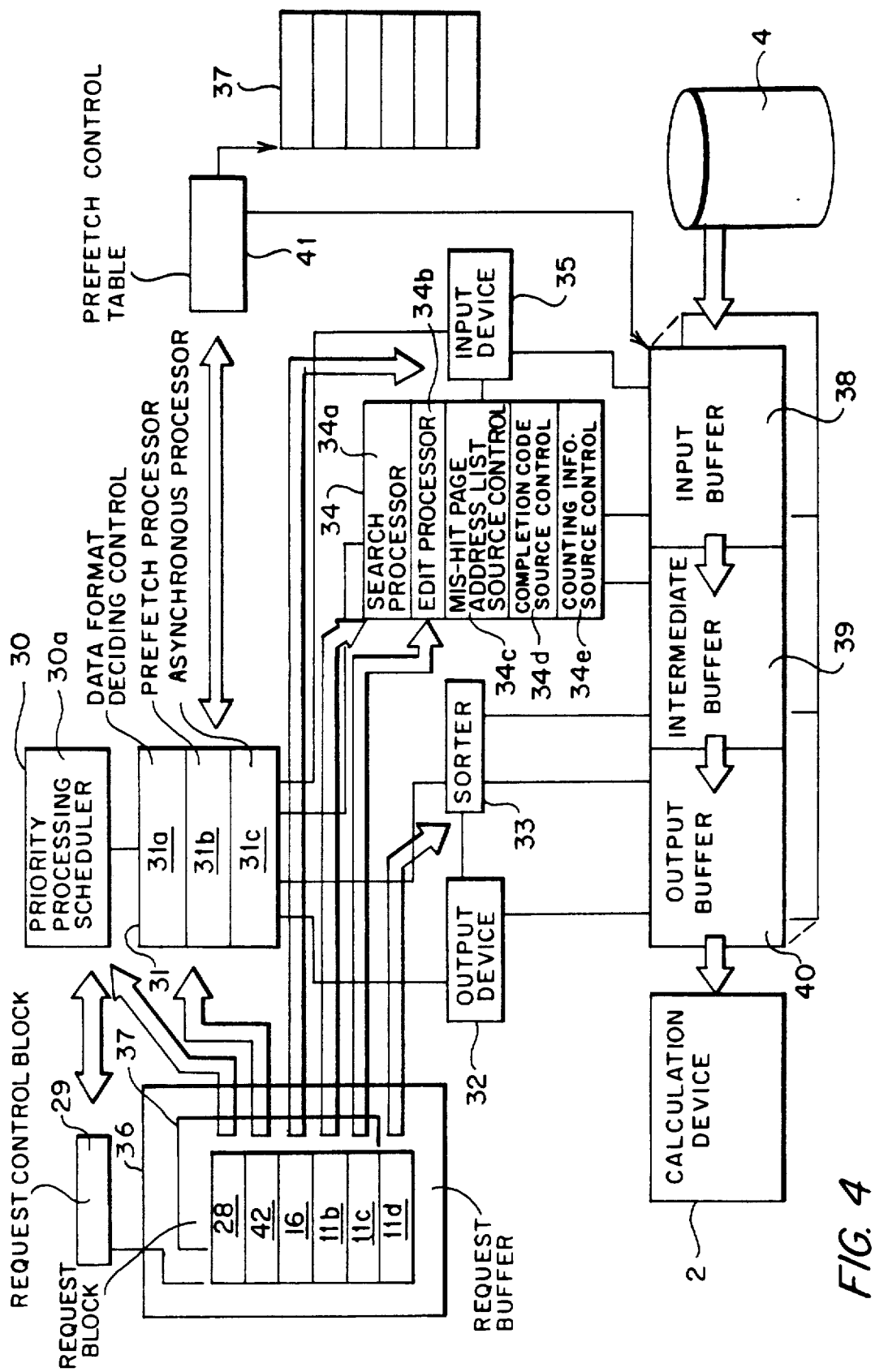
FIG. 4 is a functional configuration for showing a general processing of the data processing device.

FIG. 4 illustrates general processing of the data processing device 3. The request receiving device 30 of the data processing device 3 receives a priority condition code 28, transferred from the calculation device 2 when the data processing is required. In addition to the priority condition code 28, a program code 42, CCHHR information 16, a search condition code 11b, an editing condition code 11c and a sorting condition code 11d. These are arranged as a request block 37 within the request buffer 36. The request receiving device 30 then sets a queue in the request buffer 36. The priority processing scheduler 30a of the request receiving device 30 controls a queue of the request block 37, rather than the priority condition code 28, in response to the request control block 29. The control device 31 extracts a request block 37 from the queue in the request buffer 36, transfers the input/output request program code 28, 42, 16, 11b, 11c, 11d of the request block 37 to the selection and editing device 34 for initialization, and performs a prefetching operation if an intermediate result of processing is left on the buffer which is used by the input device 35, the searching and editing device 34, the sorter 33 and the output device 32 during the input/output requests. If the input device 35 is not operated even in the middle of the input/output requests, control device 31 extracts the input/output requests for another recording medium 4 separate from the inputted recording medium 4 from among the input/output requests from the request buffer 36 and energizes the input device 35.

The input device 35 refers to the CCHHR code of the list of relative byte addresses 16 in the request block 37 if the energization request is generated from the control device 31, inputs the data from the specified recording medium 4 and stores the inputted data in the input buffer 38.

After this operation, the control device 35 energizes the selection and editing device 34. When the energization request is generated from the input device 35, the selection and editing device 34 energizes the search processor 34a. The search processor 34a searches the data inputted in response to the search condition code 11b of the request block 37 and delivers the control to the edit processor 34b. The edit processor 34b edits the searched data in response to the editing condition code 11c of the request block 37, accumulates a result of the editing in the intermediate buffer 39 and energizes the sorter 33. When the search processor 34a performs a searching operation for data, the mis-hit page address list source control 34c sets a mis-hit page address for use in discriminating the searched data. Upon completion of the input/output requests, the completion code source control 34d provides a completion code including a data position information where the last data calculation was carried out. When the search processor 34a performs a searching operation, the counting information source control 34e sets the number of data retrieved and the number of searched data as the counting information.

When an energization request from the selection and editing device 34 is generated, the sorter 33 sorts the searched and edited result of the intermediate buffer 39 in reference to the sorting condition code 11d of the request block 37, outputs the sorted result to the output buffer 40 and energizes the output device 32.

Figures 5, 37:
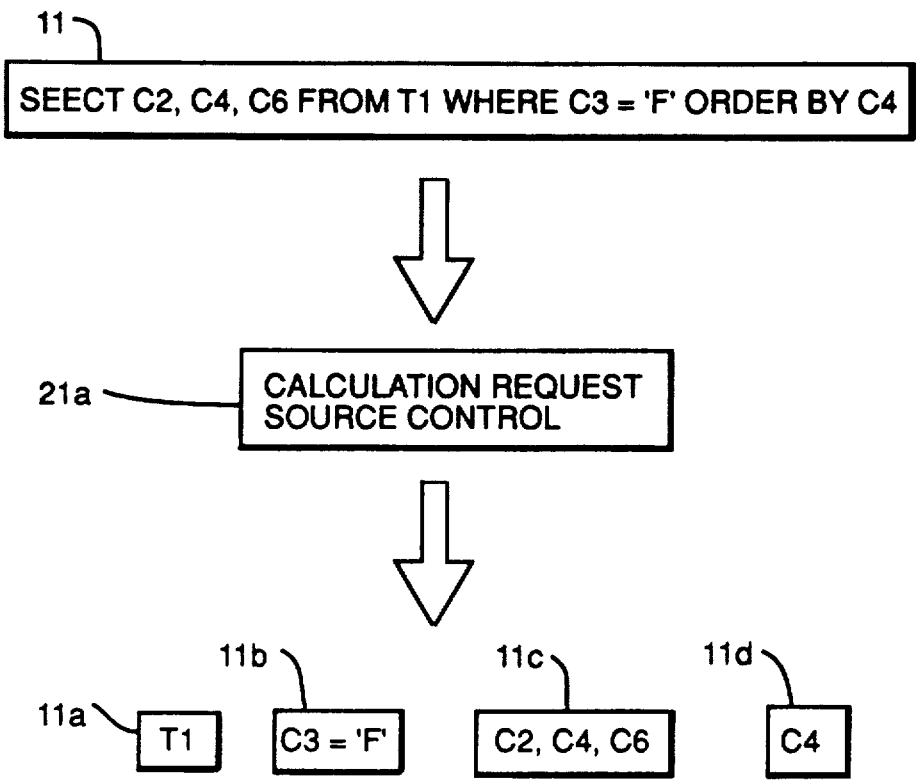
FIG. 5 is an example of the general processing of the calculations request source control.
FIG. 37 shows an example of the buffer choice table.
Figure 18:
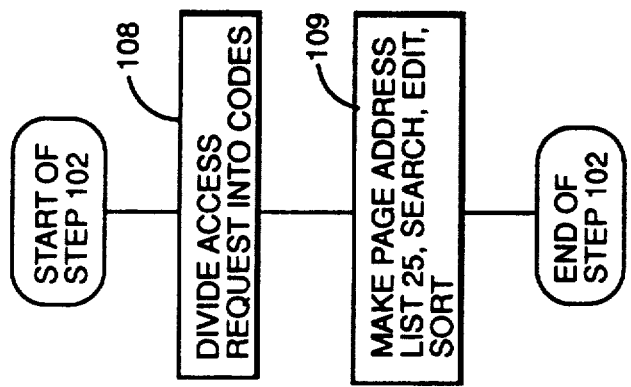
FIG. 18 is a flow chart of step 102 of FIG. 17.
Figure 17:
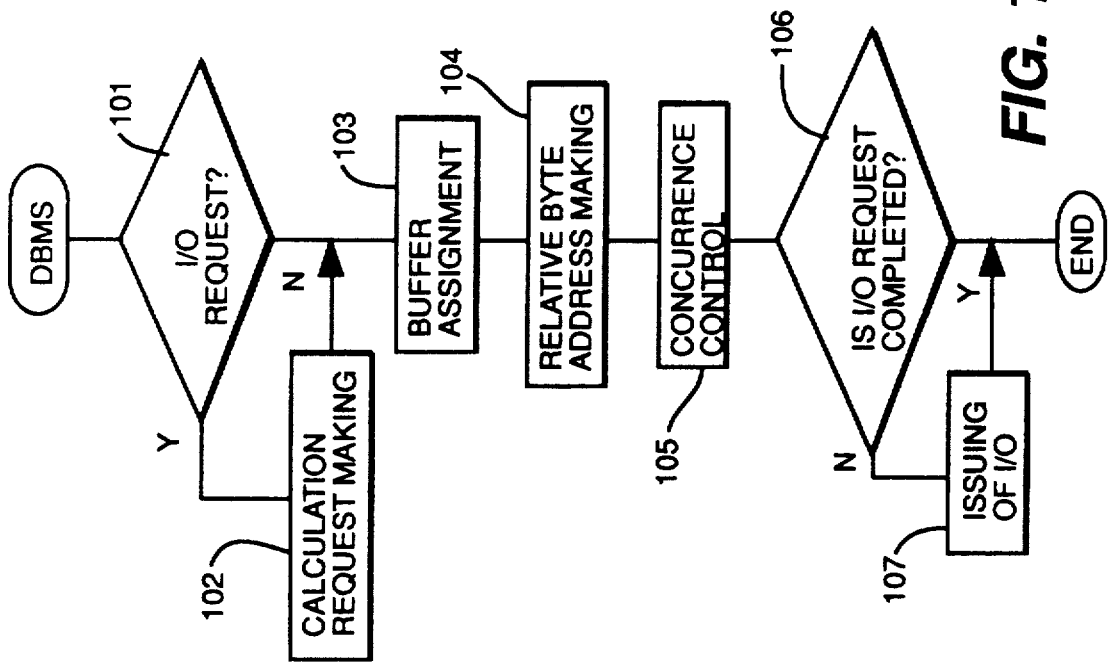
FIG. 17 is a flow chart of the DBMS control.

With reference to FIG. 3, when a user transmits the access request 11 from the terminal 1 (YES flow from step 101 of FIG. 17), the calculation request source control 21a of DBMS 21 converts the access request 11 into a page address list code 11a, a search condition code 11b, an editing condition code 11c and a sorting condition code 11d (step 102 of FIG. 17 and step 108 of FIG. 18). FIG. 5, illustrates a general processing of the calculation request source control 21a. In this example, the access request 11 retrieves from a table T1 a record 41a (FIG. 2) having an "F" in the third column C3, USING CODES 11a, 11b. The second, fourth and sixth columns C2, C4 and C6 are edited from this record using code 11c, and the edited result is sorted by the fourth column C4 using code 11d. With this arrangement, T1 is set by the page address list code 11a, C3='F' is set by the search condition code 11b, C2, C4 and C6 are set by the editing condition code 11c and then C4 is set by sorting condition code 11d. This is shown in 102 in FIG. 17 and 109 in FIG. 18.

Figure 19:
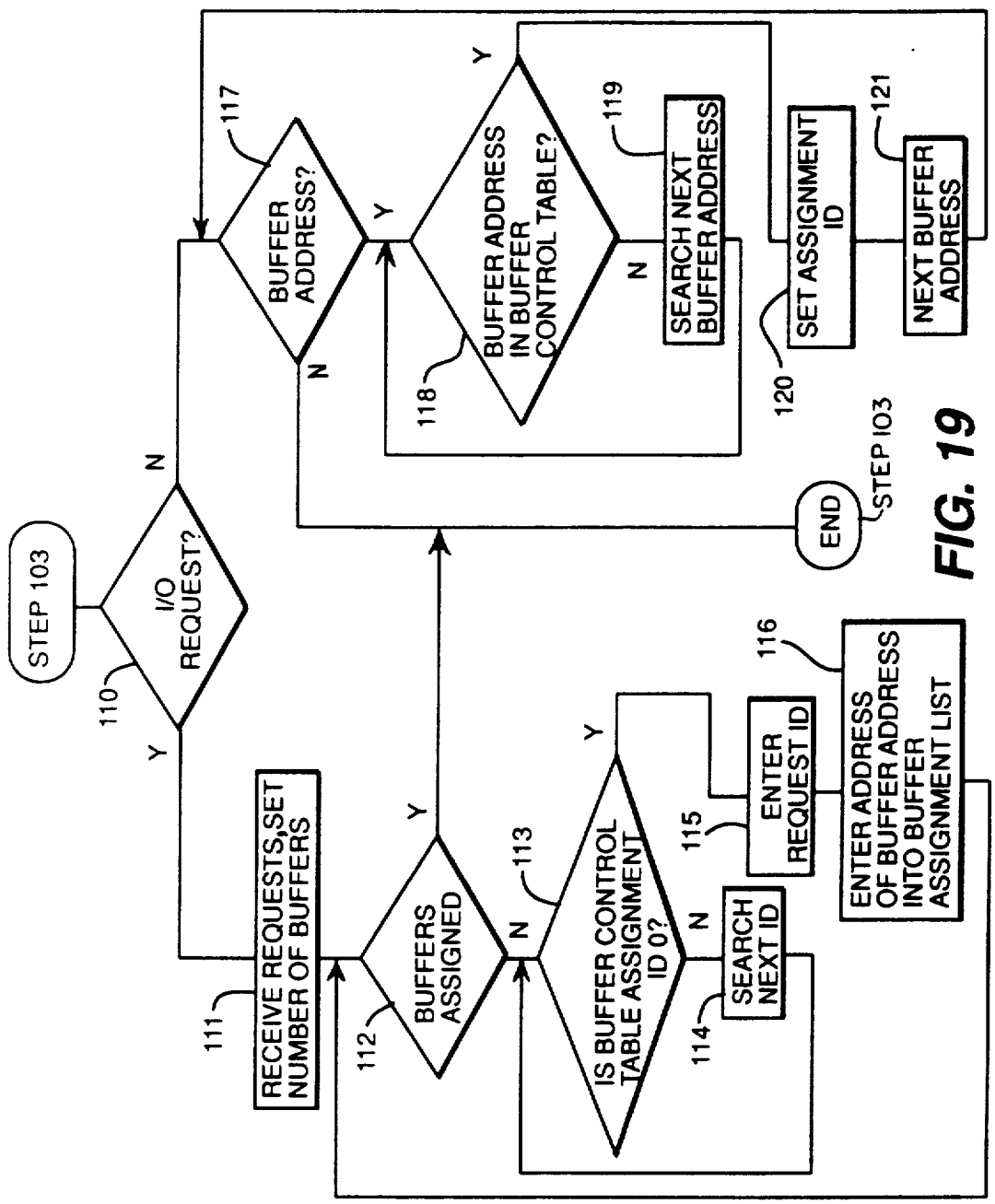
FIG. 19 is a flow chart of step 103 of FIG. 17.

Buffer assignment is accomplished in step 103 of FIG. 17, which is shown in more detail in FIG. 19.

DBMS 21 transfers control to the buffer control 21b in order to assign the buffer required for performing a searching request (start step 103 of FIG. 17). The buffer control 21b inputs the processing type code 10 as shown in FIG. 3. If a page selection is to be carried out by on-line processing as determined by the processing type code 10, buffer control 21b sets the number of assignments of the buffer to equal the number of blocks in the page address list code 11a (step 111). Then it determines the request number 12c as the mis-hit page address list 17 of the access request 11 within DBMS 21 by referring to the buffer control table 12, reserves the buffers by the number of buffers 12d defined by a non-assigned buffer and then extracts the buffer address 12b stored in the buffer assignment list 13. The number of buffers 12d that are assigned is illustrated in the buffer choice table 46 of FIG. 37.

Figure 6A:
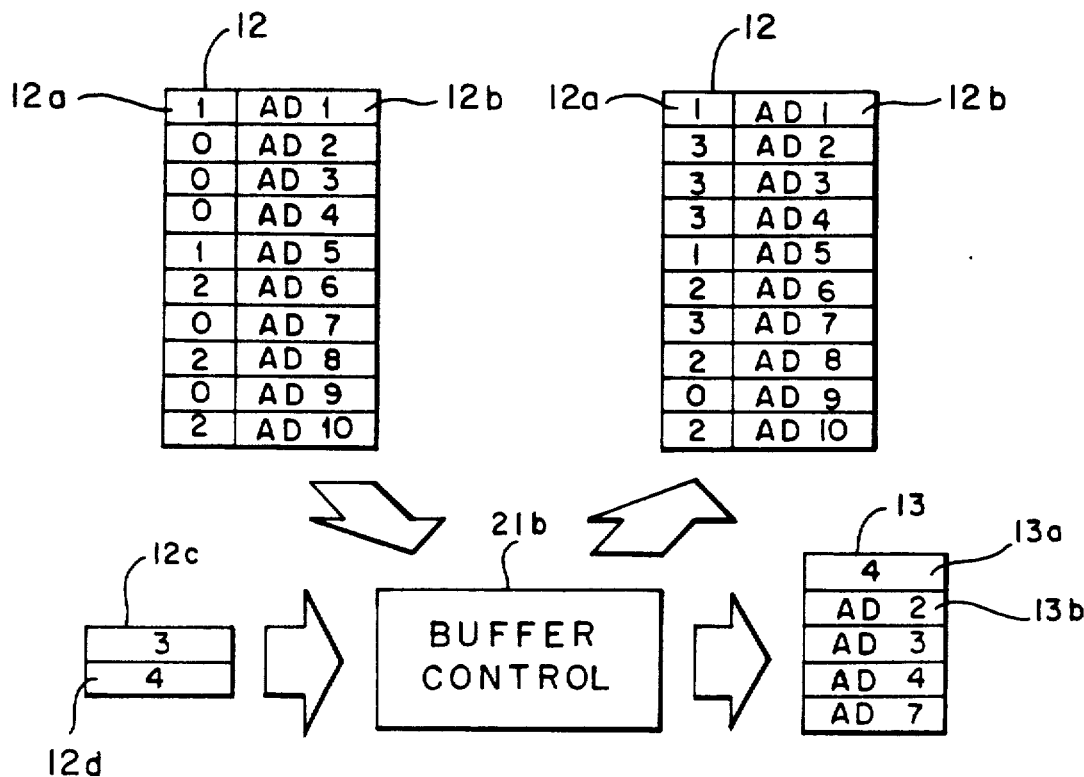
FIG. 6a illustrates a general processing of the buffer control.

FIG. 6a illustrates a general processing of the buffer control 21b. In this example, there are a total of ten buffers, AD1 to AD10, wherein a request No. 1 assigns the first and fifth buffers, a request No. 2 assigns the sixth, eighth and tenth buffers and a request No. 3 for the page selection requests four buffers. As shown in this figure, this is an example in which the buffer is required (no previous assignment in step 112). The buffer control table 12 is searched from the leading end (steps 113, 114). The second, third, fourth and seventh non-assigned buffers are assigned (step 115). The buffer addresses 12b (AD2, AD3, AD4 and AD7) are assigned to the buffer assignment list 13 in the address list 13b (step 116). The number of buffers assigned is accumulated and stored in the list count 13a (step 116). This is shown in step 103 in FIG. 17 and steps 110 to 116 in FIG. 19.

Figure 6B:
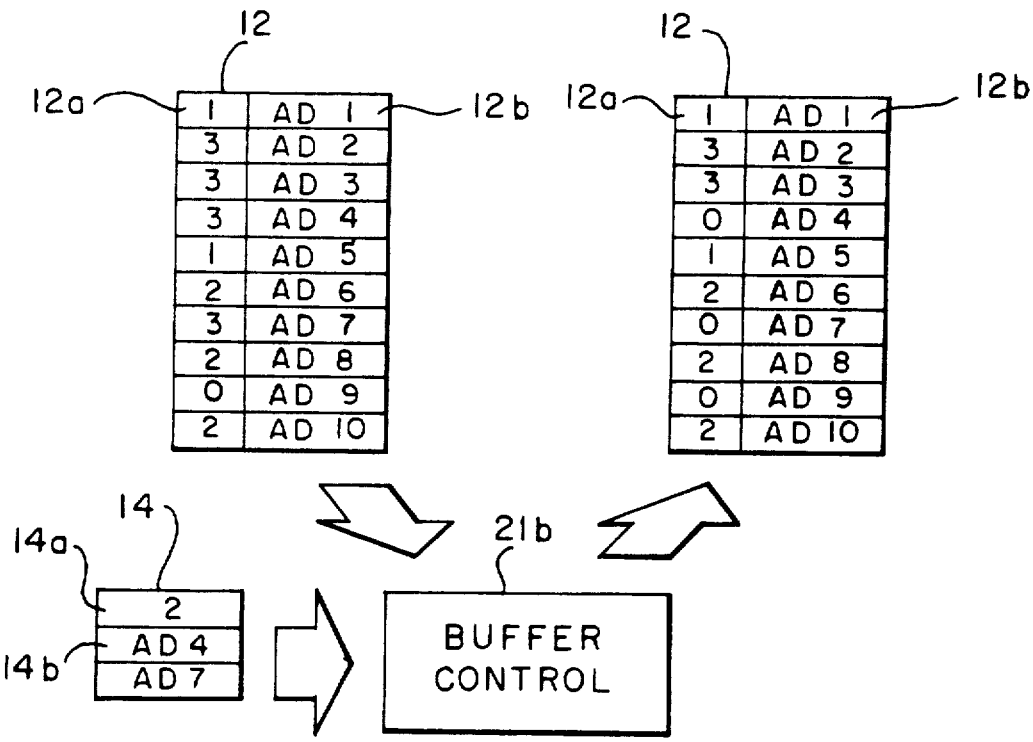
FIG. 6b illustrates a general processing of the buffer control upon completion of the access request.

The buffer control 21b calculates the buffer address in reference to the relative byte address of the logical address information 16c received from the data access program 22, upon completion of the access request and release of the buffer assignment of the buffer control table 12. FIG. 6b illustrates a general processing of the buffer control 21b upon completion of the access request 11 and shows the empty buffer list 14. In this example, there are two (according to empty buffer count 14a) buffers AD4, AD7 (buffer ID numbers 14b) having buffer addresses 12b, so that the fourth and seventh assignment numbers, 12a of the buffer control table 12 are set to 0 to release the assignment work. This is shown in steps 110, 117, 118, 119, 120 and 121 in FIG. 19.

Figure 20:
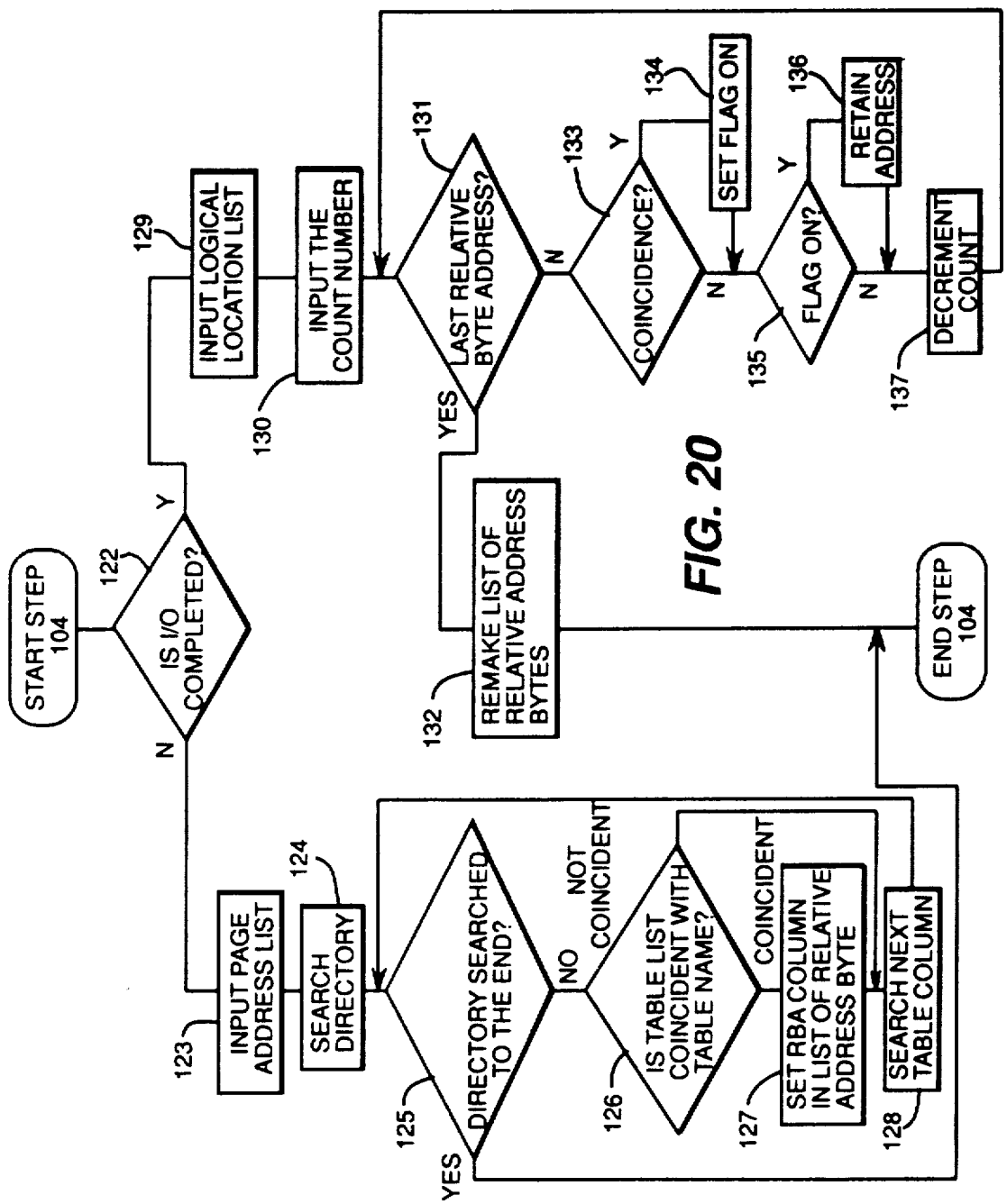
FIG. 20 is a flow chart of step 104 of FIG. 17.

DBMS 21 transfers control to the relative byte address source control 21c (step 104 of FIG. 17), in order to convert the page address list code 11a (input in step 123 of FIG. 20), set at the calculation request source control 21a, into the list of relative byte addresses 16 (FIG. 3). The relative byte address source control receives the mis-hit page address list 17. The relative byte address source control 21c checks the data base directory information 15 (steps 124 and 125) controlling mapping information between the buffer control table 12 and the relative byte positions and converts it into the list of relative byte addresses 16. In case they are coincident as determined by step 126, the relative byte position is expressed by the RBA (Relative Byte Address) in the RBA column 15b indicating a relative position from a leading record in the data (step 127) and the next table column is searched (step 128) until the end of the directory is reached (step 105) leading to the end of step 104.

Figure 7A:
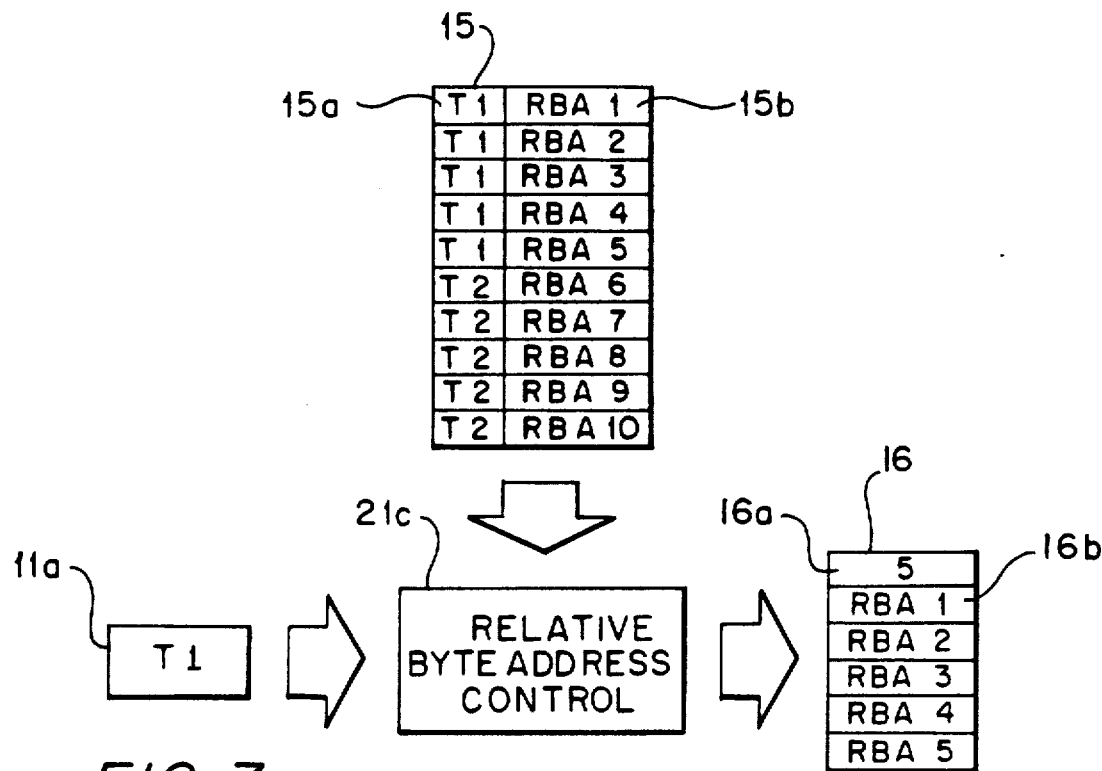
FIG. 7a illustrates a general processing of the relative byte address control.

FIG. 7a illustrates a general processing of the relative byte address source control 21c. In this example, tables T1 and T2 of the table information column 15a are set on the data base. Table T1 is inputted as the page address list code 11a. RBA1, RBA2, RBA3, RBA4 and RBA5 are extracted as the address list 16b of the list of relative byte addresses 16. The number of lists is inputted to the list count 16a. This is shown in step 104 in FIG. 17 and steps 122 to 128 in FIG. 20.

The relative byte address source control 21c may remake (step 132) the list of relative address bytes 16 from the relative page address of the logical address information 16c (input in step 129) received from the data access program 22, upon completion of the access request (yes answer to step 122). In step 130, the count number is inputted, that is the number of byte addresses in the list. If the count number indicates the last byte address in step 131, flow is to step 132 to remake the list, otherwise it is to step 133 to see if the physical and logical address of the count number coincide. If they do, the reproduction flag is turned on for that address in step 134. If the flag is ON, as determined by step 135, the address of the count number is retained for the new list in step 136. In step 137, the count number is decremented and flow returns to step 131 and when all of the addresses have been processed, as shown by the count number, the addresses retained in step 136 are stored as the remade list of relative byte addresses 16 in step 132.

Figure 7B:
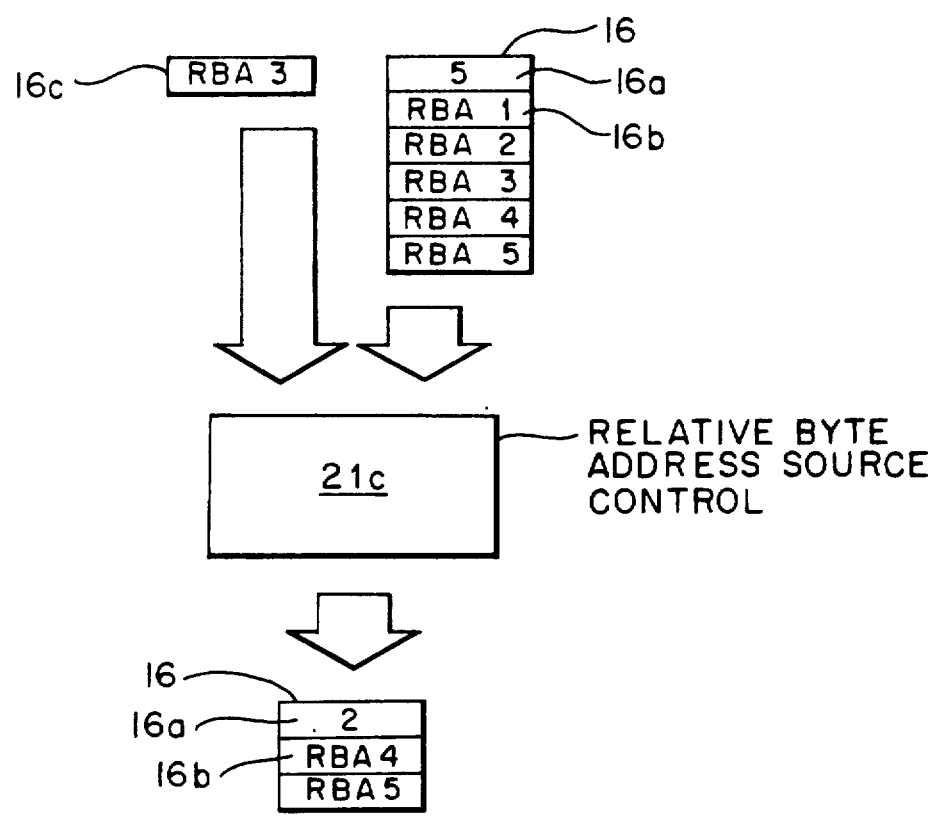
FIG. 7b illustrates a general processing, upon completion of the access request, of the relative byte address source control.

FIG. 7b illustrates a general processing upon completion of the access request by the relative byte address control 21c. In this example, since the address RBA3 is returned from the data access program 22 as the relative byte address of the logical address information 16c, the list of relative byte addresses 16 is checked and the list of relative byte addresses 16 is remade to be RBA4 and RBA5. This is accomplished by a flow of step 122 and steps 129 to 137 in FIG. 20.

Then, DBMS 21 transfers control to the concurrence control 21d (step 105 in FIG. 17) in order to concurrence control a page corresponding to the relative page address set by the relative byte address source control 21c. The manner of performing the concurrence control is briefly described below with reference to the steps of the flow chart of FIG. 21.

Figure 9A:
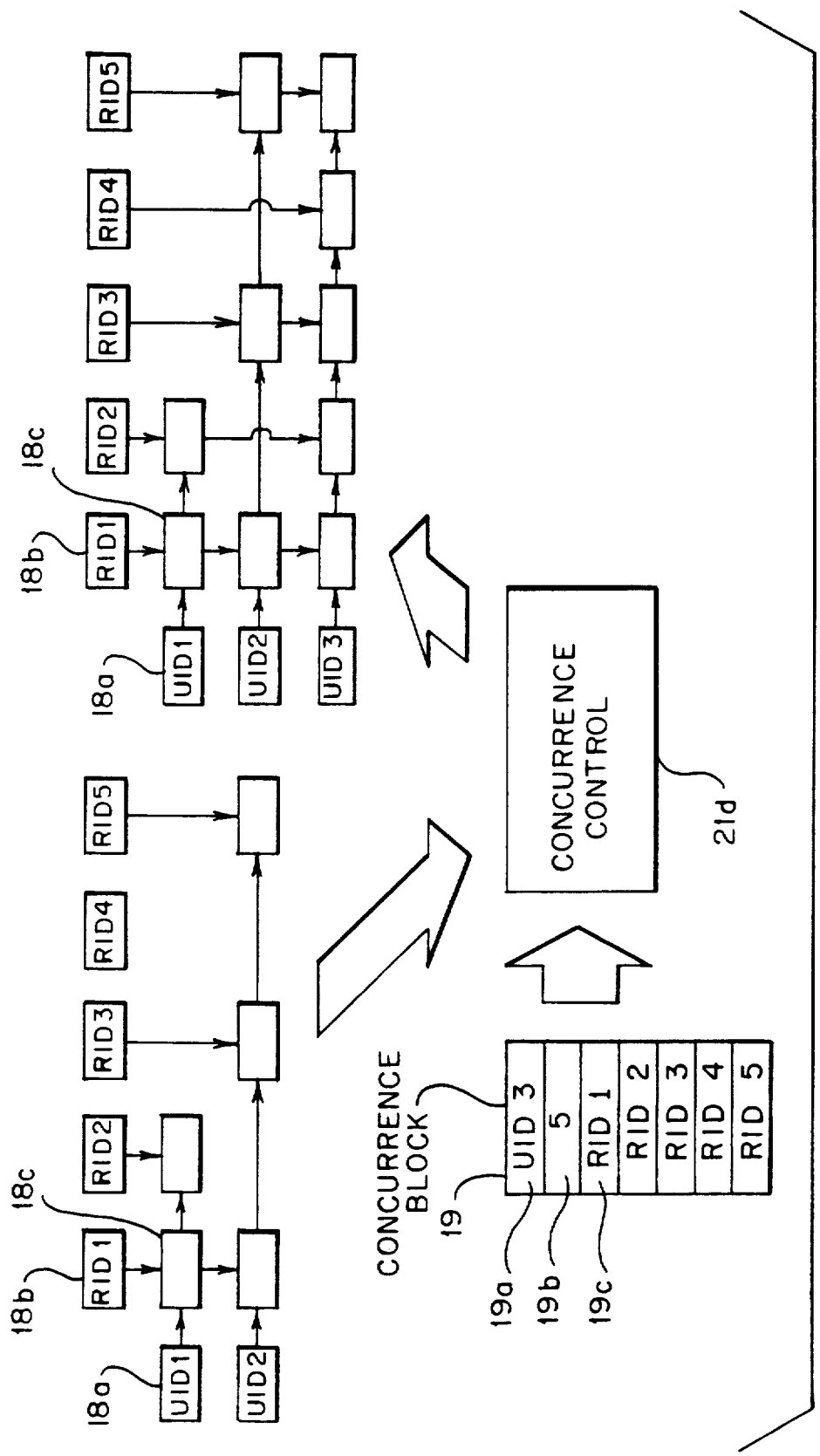
FIG. 9a shows the concurrence request control block set to correspond to the number of pages required by the user and, chained from the user control block.

As shown in FIG. 9a, the concurrence request control block 18c, of the concurrence control block 18, is set to corresponds to the number of pages required by the user and is chained from the user control block 18a. Also, the concurrence request control block 18c is chained from the corresponding page control block 18b. Then, each of the concurrence states within the concurrence request control block 18c, chained from the corresponding page control block 18b, is referred and it is determined if the page can be assured or not. In this way, when all the pages are assured, the processing of the user, corresponding to the user control block 18a, is executed.

If the I/O request is not completed, step 138, the concurrence control 21d refers to the concurrence control block 19, after receiving control from DBMS 21, and sets the user control block 18a from the user identification number at part 19a, input by step 139. After that, the page numbers from part 19c referred to only by the number described by the list count 19b are input by step 139. The concurrence request control block 18c is pointed to or chained from the corresponding page control block 18b, step 140. At this time, all of the concurrence request control blocks 18c chained from or pointed to by the page control block 18b are checked and a concurrence made or state of the concurrence request control block 18c is defined, step 141.

In this example, shown in FIG. 9a, five pages of RID1, RID2, RID3, RID4 and RID5 are present and under a condition in which the user ID number 19a being UID3. UID1 accesses the page numbers. RID1 and RID2, the user identification number 19a of UID2 accesses the page numbers. RID1, RID3 and RID5. As shown in the concurrence block 19, the user having the user identification number. 19a of UID3 performs a concurrence request for five pages, as shown by the list count 19b, of the page identification numbers. RID1, RID2, RID3, RID4 and RID5, which are the resource numbers 19c. This is shown in step 105 in FIG. 17 and steps 138 to 141 in FIG. 21.

Then, DBMS 21 issues the access request for the data access program 22. This is shown in step 106 in FIG. 17.

Figure 9B:
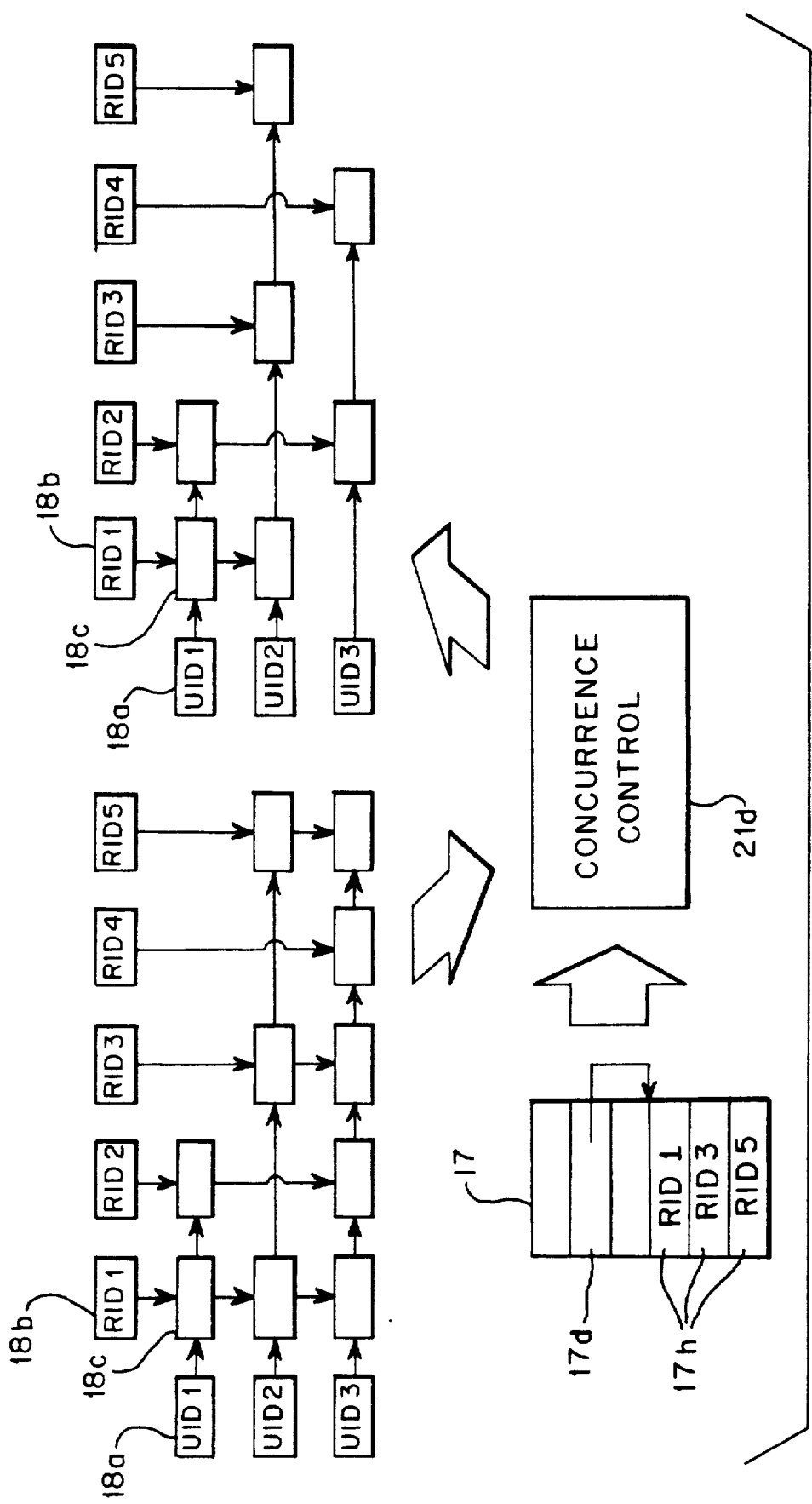
FIG. 9b illustrates a general processing of the concurrence control upon completion of the access request.
Figure 21:
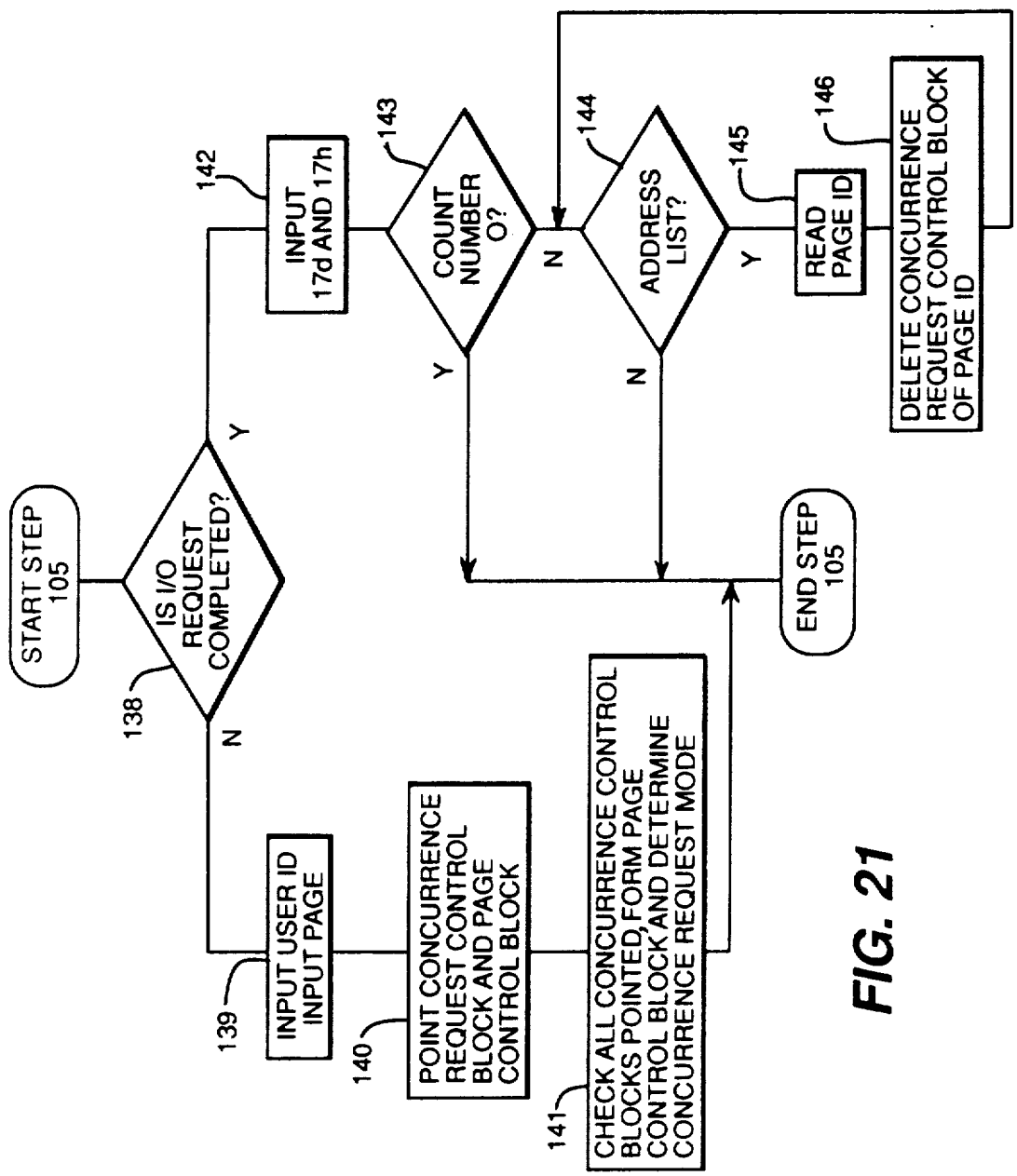
FIG. 21 is a flow chart of step 105 of FIG. 17.

The concurrence control 21d releases the unused pages from the mis-hit page address list 17 received from the data processing device 3 upon completion of the access request, yes answer to step 138 of FIG. 21. FIG. 9b illustrates a general processing of the concurrence control 21d upon completion of the access request, i.e., steps 142 to 146 of FIG. 21. Here, the page identification numbers RD1, RID3 and RID5 stored as unused in the mis-hit page address list 17 and 17h the number of such numbers 17h is stored as a count number 17d are input, step 142. If the count number is zero, step 106 ends and if not, it is determined if the mis-hit page identification numbers are present, step 144. If not step 107 ends, but if they are, processing proceeds to step 145 to read the page identification number corresponding to the count number. In step 146 a corresponding concurrence request control block 18c is deleted. This is shown in steps 138 and 142 to 146 in FIG. 21.

Figure 8:
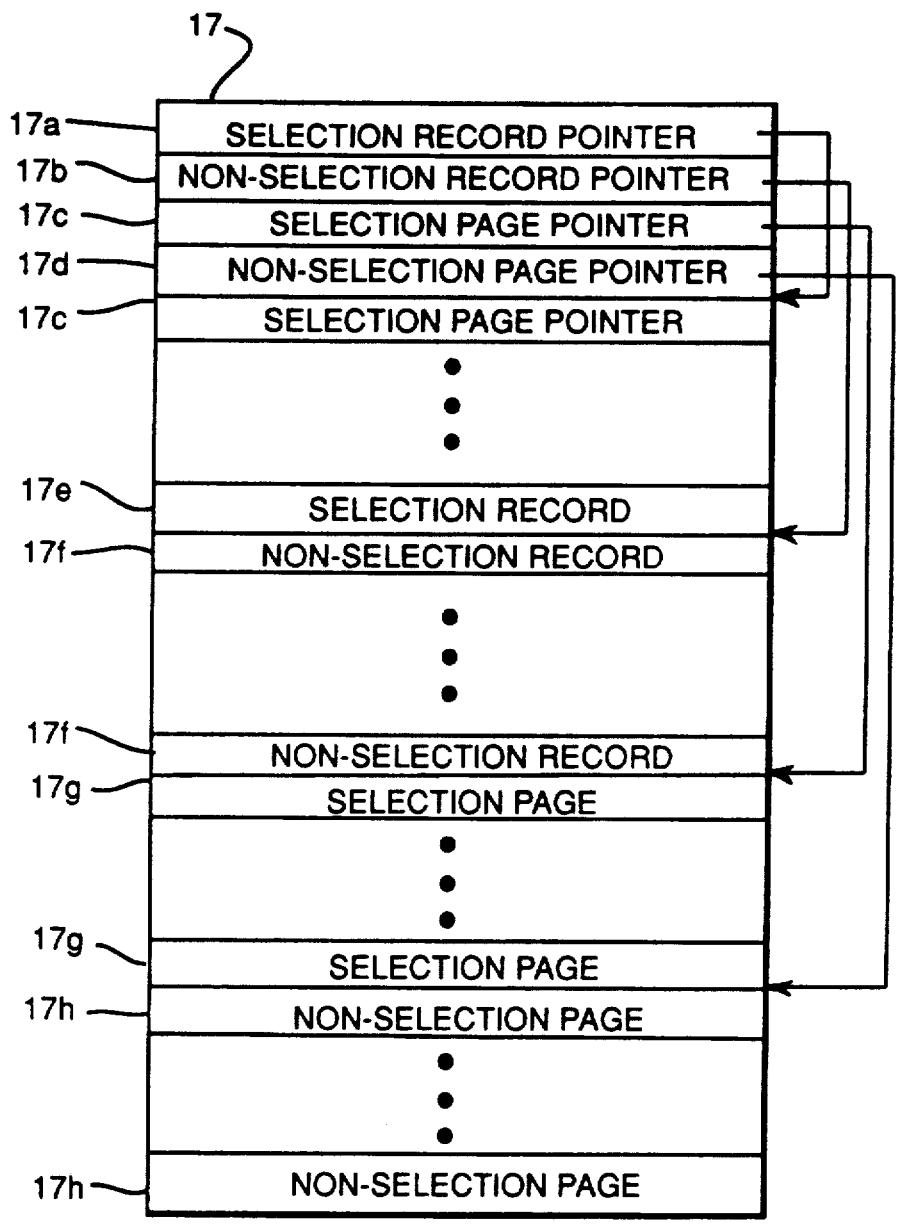
FIG. 8 shows the data format of the mis-hit page address list.

The data structure of the mis-hit page address list 17 is shown in FIG. 8, wherein 17a is the selection record pointer, 17b is the non-selection record pointer, 17c is the selection page pointer, 17d is the non-selection page counter, 17e is the selection record, 17f is the non-selection rcord, 17g is the selection page, 17h is the non-selection page I.D. number.

Then, DBMS 21 transfers control to the priority order determination control 21e. The priority order determination control 21e, as shown in FIG. 3, inputs the processing type code 10. In the case of on-line processing, the priority order determination control 21e provides a high priority order for priority condition code 28.

With reference to FIG. 3, the data access program 22 transfers control to the prefetch determination control 22e if the I/O request is received from DBMS 21. The prefetch determination control 22e refers to the data processing device utilization state table 45 of the data processing device 3. If the number of input/output access requests is smaller than the number of recording medium 4 connected under the control of the data processing device 3, the prefetch determination control 22e determines that there is to be prefetching. If the number of input/output access requests is higher than the number of recording medium 4, the determination is that the prefetching operation is not to be carried out, and instead, the buffer control table 12 is referred to and the relative byte addresses divided among the number of buffers.

Upon completion of the prefetching operation the data access program 22 transfers control to the page address list control 22a. As seen from FIG. 3 the page address list source control 22a converts the list of relative byte addresses 16 set by DBMS 21 into the CCHHR code intermediate information 24 in the page address source list 25, so that each entry of the list of relative byte addresses 16 is set to a CCHHR code position, with the input of an extent information code 23. The page address list source control 22a checks for a continuous characteristic of the relative byte address and if continuous, the page address list control 22a sets a continuous counter for showing what number of blocks are continuous and transfers the counter number into the list of CCHHRs that is the page addresses list 25.

Figure 10:
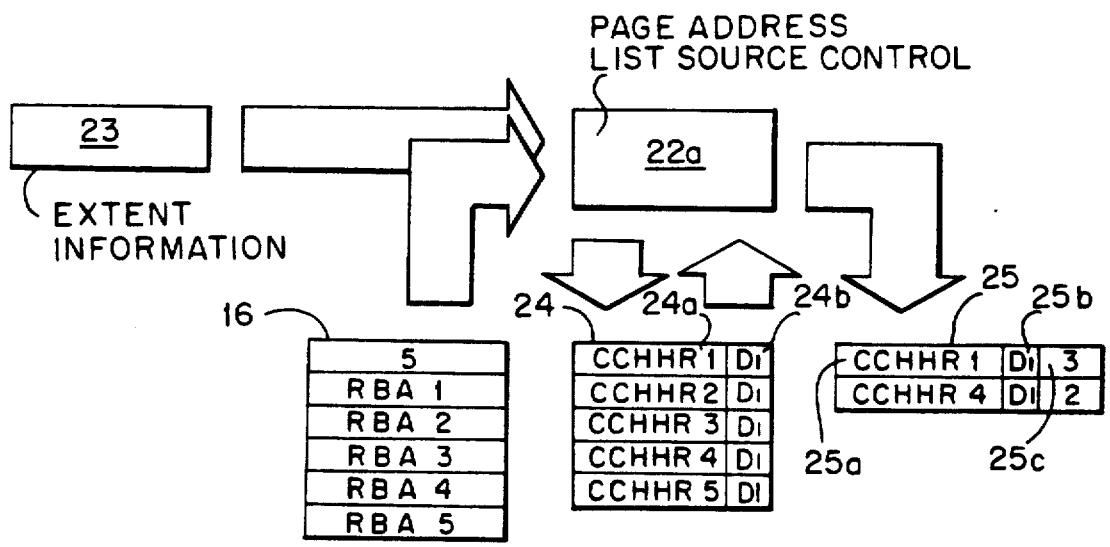
FIG. 10 illustrates a general processing of the page address list source control.

FIG. 10 illustrates a general processing of the page address list source control 22a. In this example, as logical positions of the list of relative byte addresses 16, five RBAs of RBA1, RBA2, RBA3, RBA4 and RBA5 are inputted, and the extent information 23 is also inputted. Each of the physical positions corresponding to the logical positions is defined as CCHHR1, CCHHR2, CCHH3, CCHHR4 and CCHHR5 by the page address list source control and stored as addresses 24a of intermediate information 24. This physical position is an example in which the device No. 25b, e.g. D1, is stored on the same recording medium 4 as each of CCHHR1, CCHHR2, CCHHR3, CCHHR4 and CCHHR5 in the physical positions that are continuous, respectively.

Figure 22:
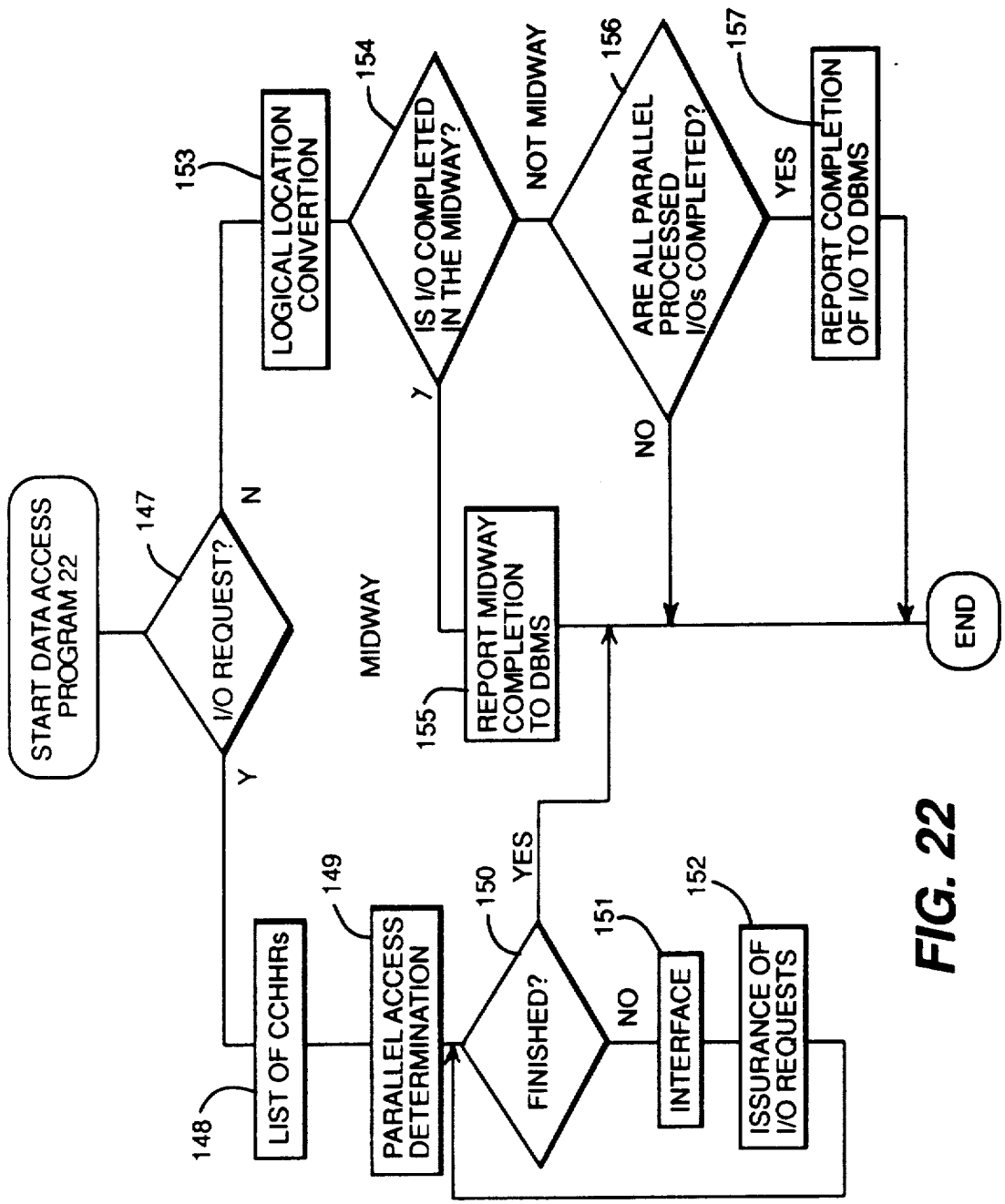
FIG. 22 is a flow chart of the data access program control.
Figure 23:
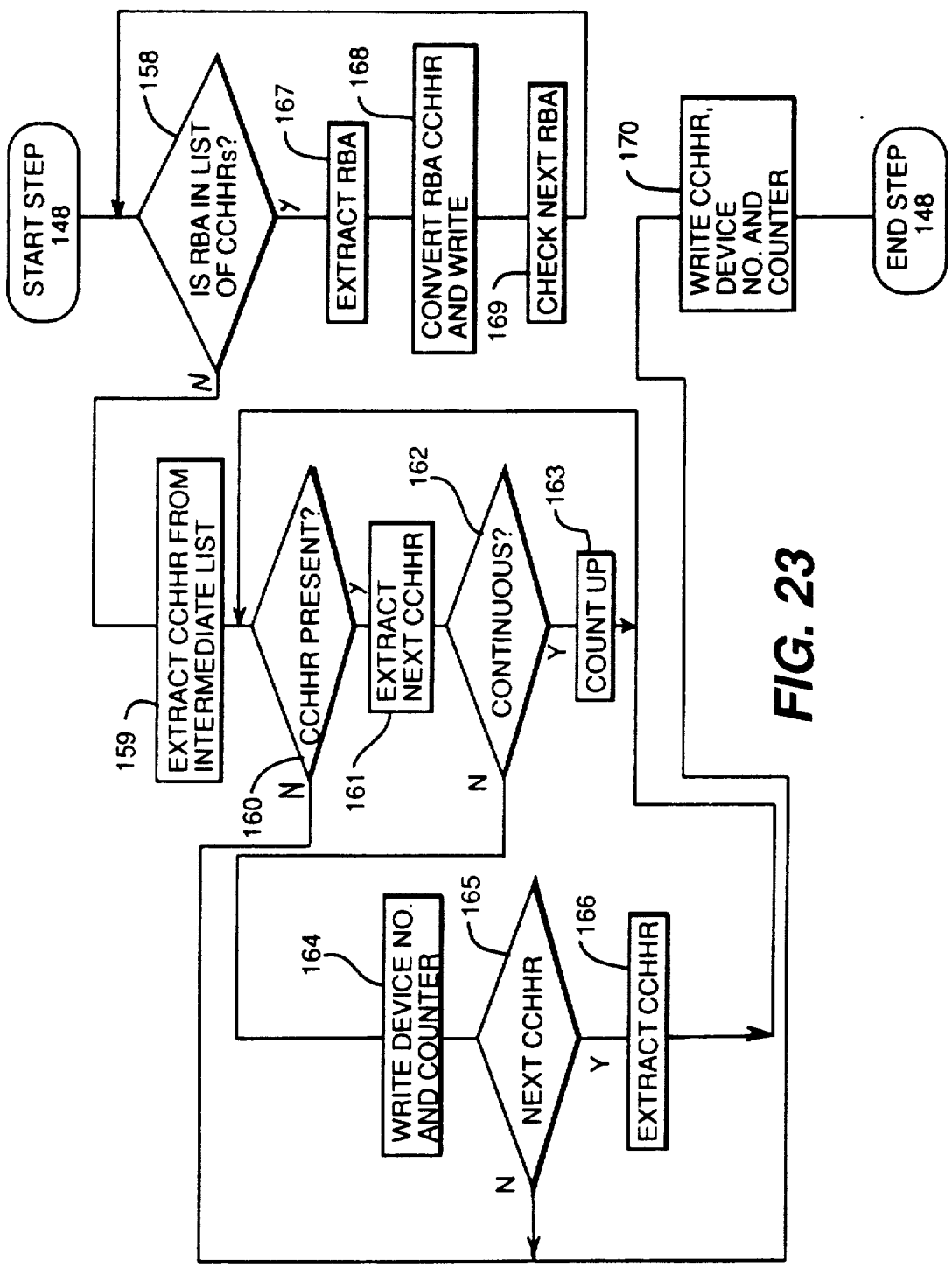
FIG. 23 is a flow chart of the step 148 of FIG. 22.

This processing of FIG. 10 is shown in steps 147 and 148 in FIG. 22 and 158 to 170 in FIG. 23. If an I/O request is found in step 147, the processing flows to step 148 of FIG. 22, which is shown in more detail in steps 158 to 170 of FIG. 23. In the absence of the RBA, according to step 158, step 159 is executed to extract the CCHHR codes from the intermediate information 24 in step 159, and the presence of CCHHR code is determined in step 160. If no code is found in step 160 remaining in the intermediate information, step 170 will write the CCHHR code, device number and continuous list counter to the list of CCHHRs, which is the page addressed list 25, and step 148 will be ended. If step 160 determines that there are further CCHHR codes in the intermediate information 24, step 161 will extract the next CCHHR code, step 162 will determine if it is continuous with the previous CCHHR code, and if it is, step 163 will count up the continuous counter 25c and processing will be returned to step 160. If the result of step 162 is no, step 164 will write the CCHHR device number 25b and continuous counter 25c to the page address list. According to step 165, there is another CCHHR code present in the intermediate information 24, the CCHHR code is extracted in step 166 and processing is returned to step 160, and if there is no additional CCHHR code in the intermediate list 24, processing is moved to step 160, described above.

Figure 11:
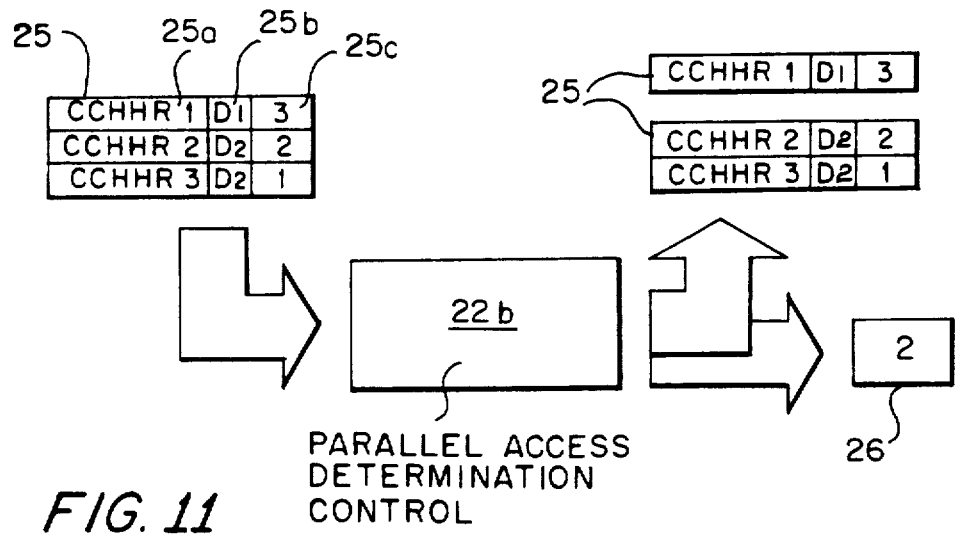
FIG. 11 indicates a general processing of the parallel access determination control.

Then as further shown in FIG. 10, the data access program 22 sorts the CCHHR addresses 25a of the page address list 25 set by the number of parallel processings 26. FIG. 11 indicates this general processing of the parallel access control 22b. In this example, each of the device numbers indicated by the first record (25c equals 1) of the page address list 25 and device numbers indicated by the second and third records is D1 and D2, respectively, and then they are recorded over two recording mediums 4.

Figure 24:
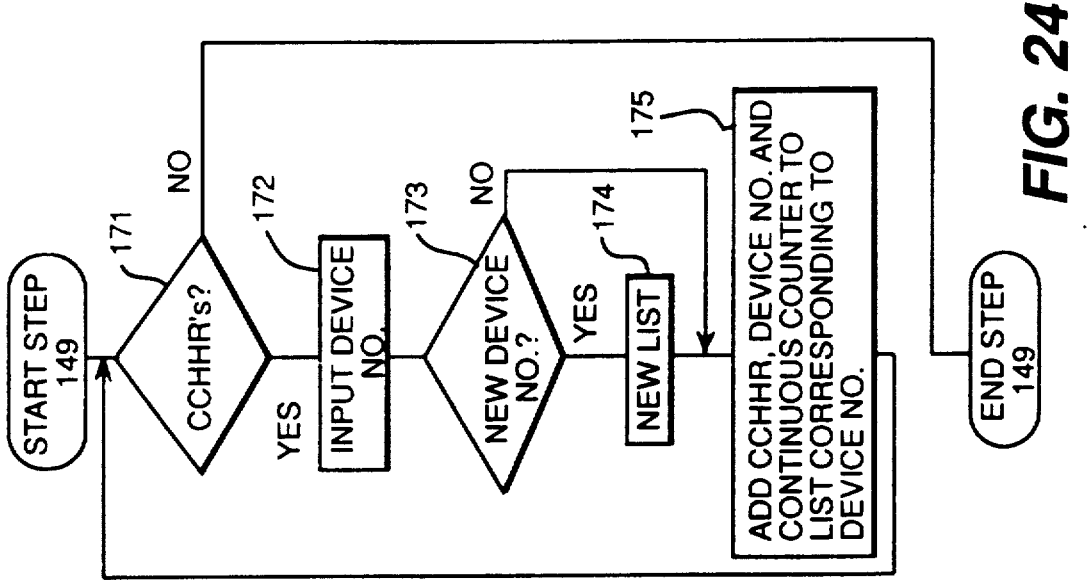
FIG. 24 is a flow chart of the step 149 of FIG. 22.

This above processing is shown in step 149 in FIG. 22 and steps 171 to 175 in FIG. 24. As shown in FIG. 24, step 171 determines if there are CCHHR addresses in the page address list, and if not processing proceeds to the end of step 149 to continue to step 150 of FIG. 22. If there are further CCHHR codes in the page address list 25, processing proceeds to step 172, where the device number is input from the page address list 25 and step 173 checks to see if this is a new device number, as compared to the previous device number: if it is, processing proceeds to step 174 for the making of a new list of CCHHR addresses; and if there is not a new device number from step 173 processing proceeds to step 175, as it does from step 174. In step 175, the CCHHR address, device number and continuous counter is added to the page address list 25 for the particular device number, that is, there is a separate page address list formed for each different device number, and then processing returns to step 171.

Then, the data access program 22 transfers control to the microprogram management control 22f. As shown in FIG. 3, the microprogram management control 22f inputs processing type code 10 and processing code information 44 to check the difference in data format in response to the type of DBMS 21 by extracting the program code 42 describing the data calculation procedure, corresponding to the data format, from the processing code information 44.

Figure 13:
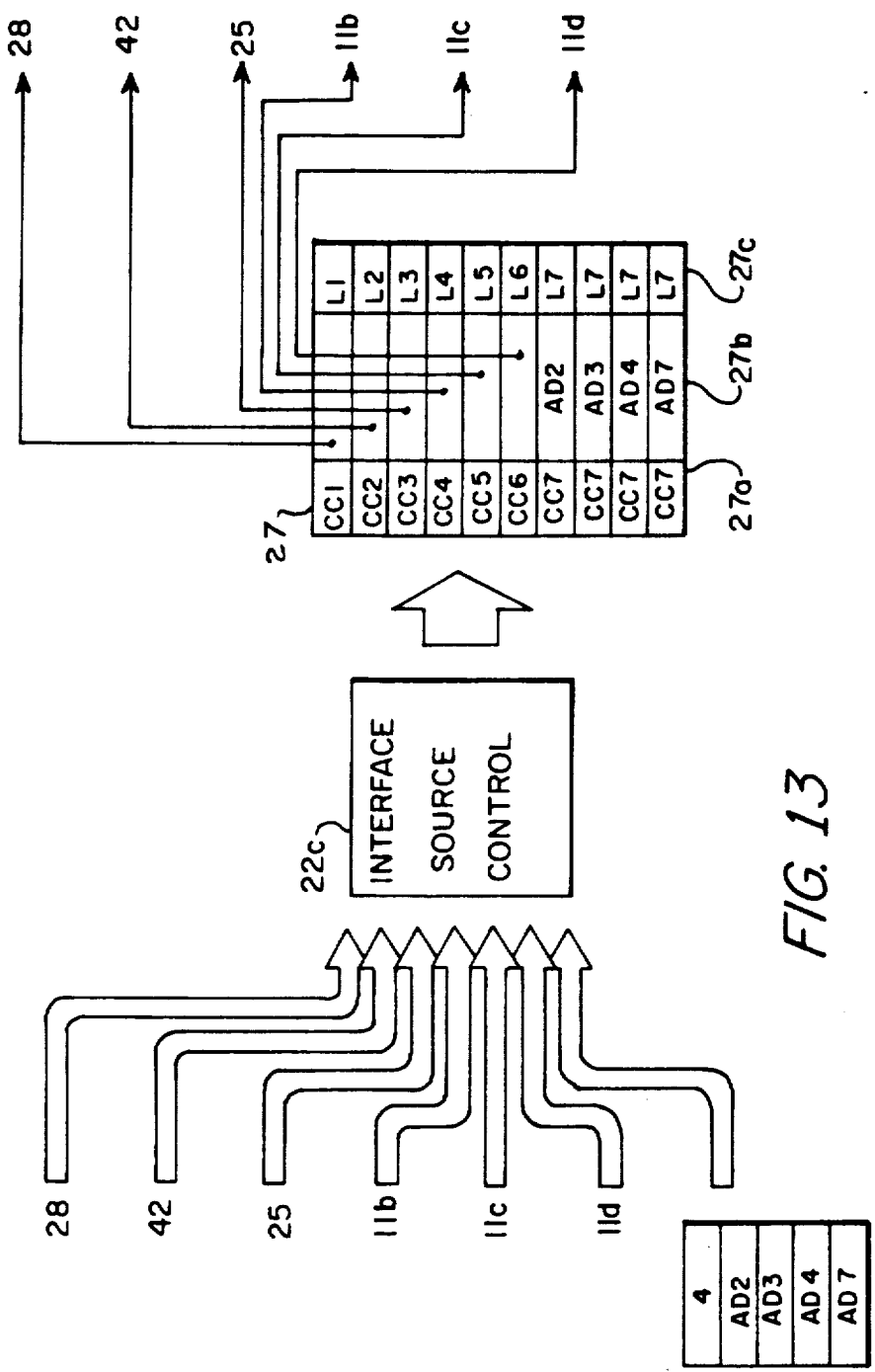
FIG. 13 shows a general processing of the interface source control.

Then, the data access program 22 transfers control to the interface source control 22c that inputs codes 11b, 11c, 11d as shown in FIG. 3 for issuing a group of input/output requests, that is channel command words (CCWs) 27 for use in energizing the data processing device 3. As shown in FIG. 13, the interface source control 22c receives a program code 42 selected by the microprogram management control 22f, a page address list of CCHHR codes 25 edited by the parallel access determination control 22b, a search condition code 11b received by DBMS 21, an editing condition code 11c, a sorting condition code 11d, buffer assignment list 13, and a priority condition code 28 describing whether the processing is an on-line processing or a batch processing. Then the interface source control 22c sets an input/output request channel command word CCW. In this example, the program code 42, priority condition code 28, page address list 25, search condition code 11b, editing condition code 11c, sorting condition code 11d, and buffer assignment list 13 are input to the interface control 22c. Four buffers are assigned to the buffer assignment list 13 as shown in FIG. 6a. The addresses of the assigned buffers are AD2, AD3, AD4 and AD7.

Figure 25:
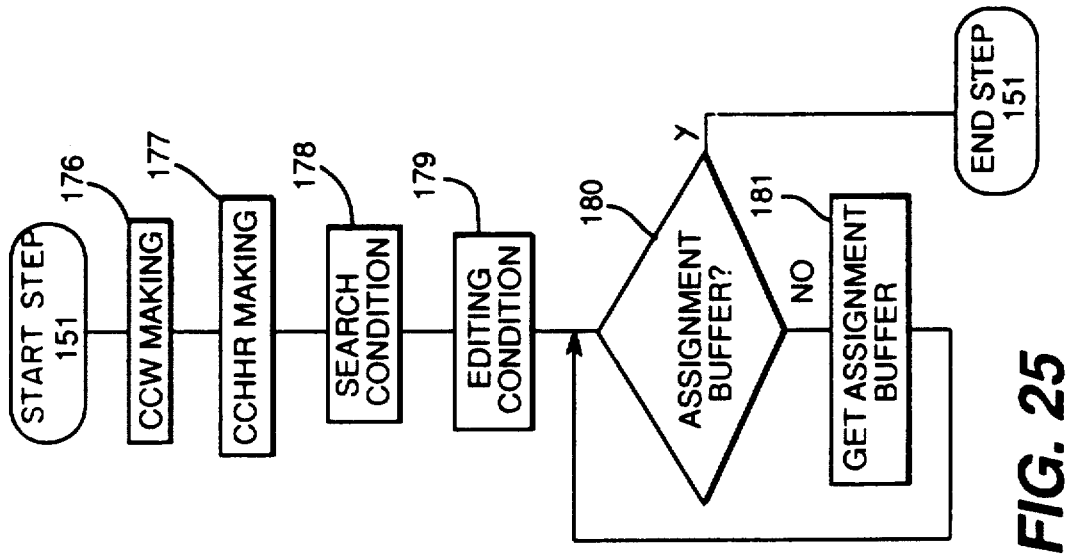
FIG. 25 is a flow chart of the step 151 of FIG. 22.

This processing of the interface source control 22c is shown in step 151 in FIG. 22 and steps of 176 to 181 in FIG. 25. Step 150 in FIG. 22 determines if the processing is finished, that is determines if the entire number of parallel processings has been accomplished: if it has, processing proceeds to the end, and if it hasn't processing proceeds to step 151, shown in more detail in FIG. 25. In step 176, the channel command word is assembled as described above, in step 177, the CCW is provided in CCHHR code, the search condition is obtained from the search condition code 11b, in step 178, in step 179, the edit condition is obtained from the editing condition code 11c, and in step 180, it is determined if the assignment of buffers has been made. If it has, processing is to step 152 of FIG. 22 wherein there is an issuance of an I/O request and processing returns to step 150. If there has not been a buffer assignment from step 180, a buffer assignment for the data is obtained from the buffer assignment table and processing returns to step 180.

Figure 12:
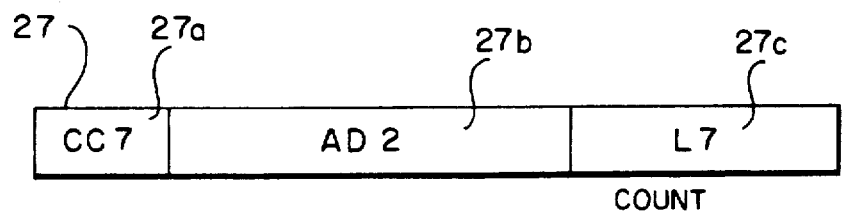
FIG. 12 shows the data format of a channel command word.

In this example, CCW (Channel Command Word) 27 is used as the input/output request command. FIGS. 12 and 13 illustrates a data structure of CCW 27 which is comprised of a command code (CC7 e.g.) 27a, a data address 27b (AD2, e.g.) and a count 27c (L7, e.g.).

The data access program 22 issues the input/output requests through the group of input/output request commands set by the interface source control 22c in step 152 of FIG. 22. The CCW signals 27 as the input/output requests are repeated for the number of parallel processings 26 collected at the parallel access determination control 22b. This procedure is shown in steps 150 to 152 in FIG. 22.

The data access program 22 transfers control to the logical locating converter 22d upon completion of input/output requests from steps 152 and 150 to the end in FIG. 22. The logical location converter 22d inputs the list of CCHHR codes 43 sent from the data processing device 3 and converts it into the list of relative byte addresses 16 in reference to the extent information code 23.

Figure 14:
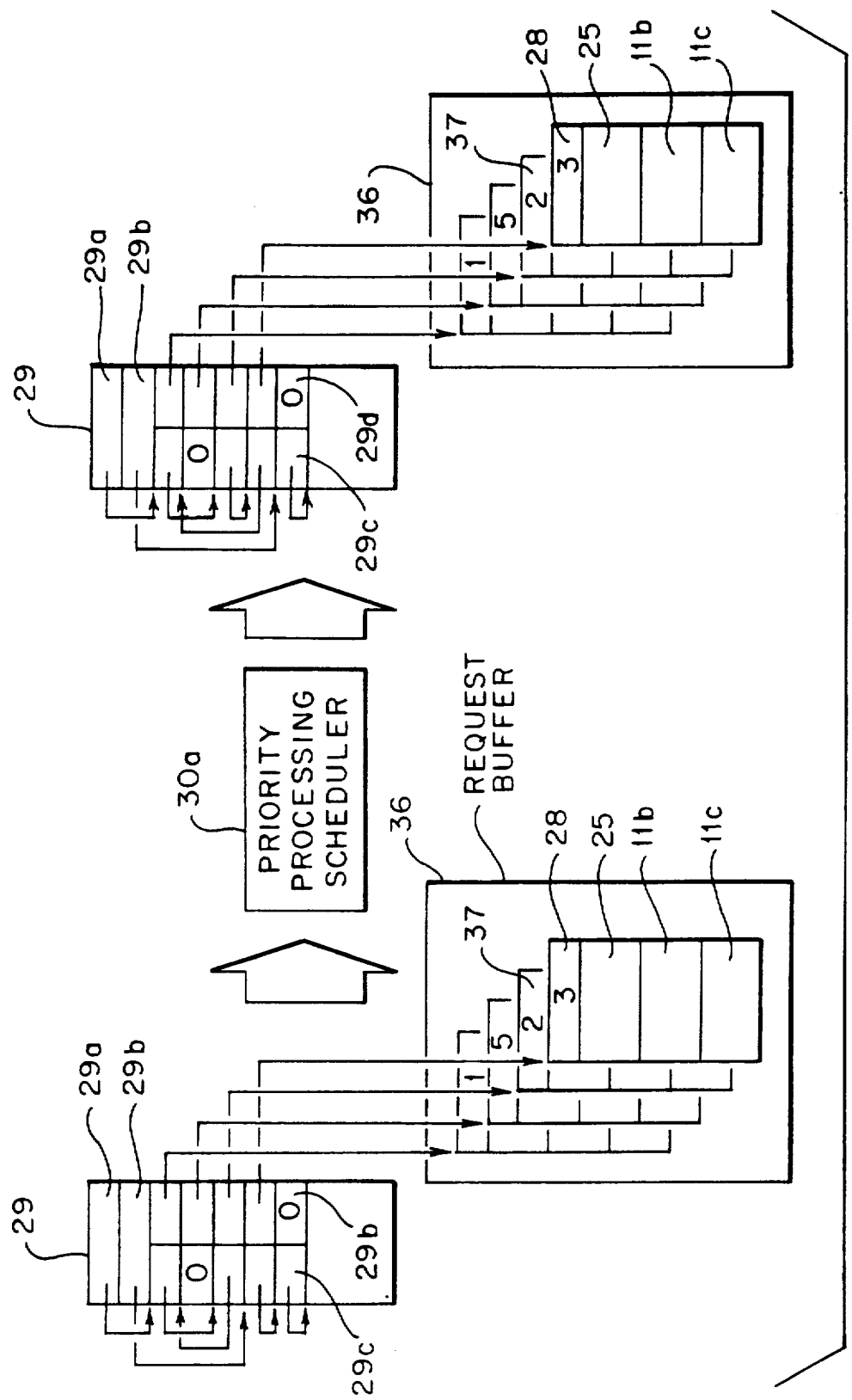
FIG. 14 illustrates a general processing of the priority processing scheduler.

The data processing device 3 energizes the request receiving device 30 if it receives the input/output requests from the data access program 22 of the calculation device 2. The request receiving device 30 transfers control to the priority processing scheduler 30a. As shown in FIG. 14, the priority processing scheduler 30a arranges the program code 42 sent, when the input/output requests are required, as a priority condition code 28, the page address list code 25, the search condition code 11b and the editing condition code 11c within each request block 37. The priority processing scheduler 30a refers to the priority condition code 28 and controls the request block 37 with the request control block 29. FIG. 14 illustrates a general processing of the priority processing scheduler 30a. In this example, request blocks 37 of request buffer 36, have the contents of "1,5,2,3" as the priority condition code 28, and the request block 37 in which the the priority condition code 28 is "3" is sent as the input/output requests. In this case, the request receiving device 30 checks if the control device 31 is energized or not. If the control device is not energized, it is energized after receiving the request.

This abovementioned processing is shown in steps 182 to 186 in FIG. 26, 189 to 194 in FIG. 27 and 187 and 188 in FIG. 26. In FIG. 26, the request receiving device receives a request from the calculation device in step 182, and the request block pointer for the non use entry pointer is retrieved from the priority control block in step 183 and checked to see if it is zero in step 184. If it is not zero, control returns to step 184 to continue the checking until it is zero when control proceeds to step 185 where the request of the block to be received is sent to the request block pointer. In step 186, the priority processing scheduler 30a performs the processing as shown in FIG. 27. Step 189 checks the request block pointer from the non use entry pointer of the priority control block and step 190 determines if the request block pointer is zero: if it is, processing is to the end of step 186 before passing to step 187 of FIG. 26; and if it is not zero, processing proceeds to step 191 to extract the priority order of a request block. In step 192, the checking of the entry is from the leading entry pointer and includes checking of the order of priority. Step 193 determines if the registered entry is lower in priority order: if it is higher, processing proceeds to step 192, and if it is lower, processing proceeds to step 194 for replacement of the next entry pointer. Upon return to step 187 in FIG. 26, it is determined whether there is a further operation in step 187, and if there is no operation, flow is to step 188, otherwise it is to the end.

Figure 28:
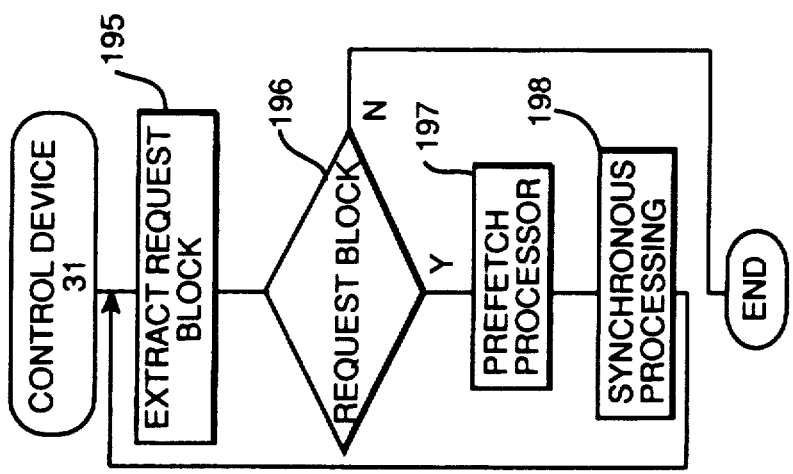
FIG. 28 is a flow chart of the control device processing.

Then, as the control device 31 is energized by the request receiving device 30, it refers to a leading entry pointer 29a of the request control block 29 and extracts the request block 37 with the request block pointer 29d according to step 195 of FIG. 28. In this case, if there is a request block 37 (step 196), control is transferred to the prefetch processor 31b (step 197). Then, control is transferred to the asynchronous processor 31c (step 198). This is the flow from an step 195 to 198 in FIG. 28.

Figure 29:
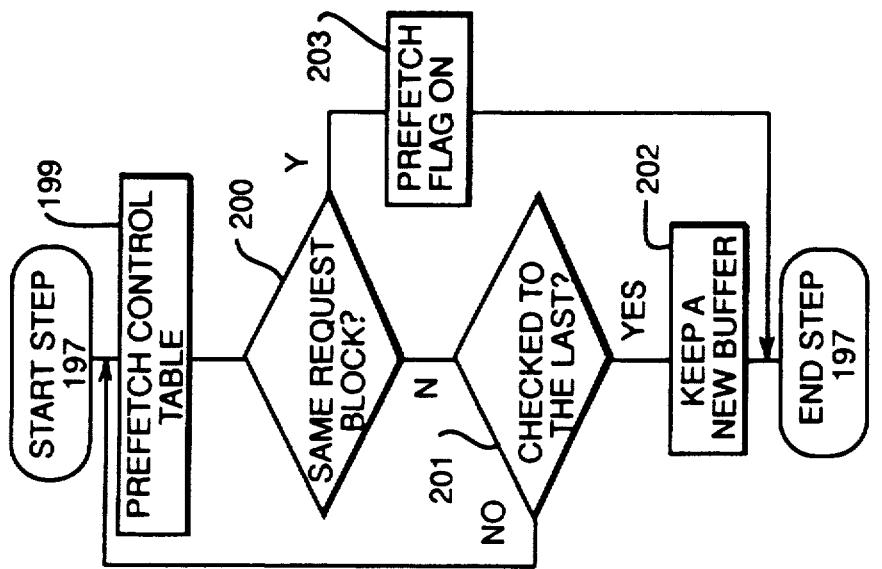
FIG. 29 is a flow chart of the step 197 of FIG. 28.

The above step 197 is shown in more detail in FIG. 29. The prefetch processor 31b refers to the pages of the prefetch control table 41 (step 199) and if the same request block 37 is not controlled by the prefetch control table 41 (step 200), it assigns a new buffer (step 202). If the last check has not been made, flow is from "N" of step 200 to step 199. If the same request block 37 is controlled by the prefetch control table 41, it turns on the prefetch flag, step 203. This is a flow of algorithms 199 and 203 in FIG. 29.

The asynchronous processor 31c, in step 198 shown in detail in FIG. 30, may refer to the request block 37 if the prefetch flag is off, step 204. If there is a program code 42 (step 205) in the request block 37, it transfers control to the data format deciding control 31a, step 206. After a hit operation, it checks if the input device 35 is energized or not (step 207) and if the input device 35 is in its energized state, it waits until the input device 35 completes its operation. If the input device 35 is not energized, the input device 35 is then energized, step 208. This is a flow of steps 204 to 208 in FIG. 30.

The data format deciding control 31a transfers the program code 42 to the selection and editing device 34 and initializes the processing par, particularly corresponding table, of the selection and editing device 34 by the data format list. This is a flow of step 209 in FIG. 31.

As seen in FIG. 32, next the input device 35, is energized by the control device 31, to extract and refer to the request block 37 with reference to the leading entry pointer 29a of the request control block 29 (step 210) and to displace the leading entry pointer 29a to the next entry pointer 29c, skipping an entry pointer 29b that is not used, step 211. After this, the page address list code 25 is extracted from the request block 37, its CCHHR position is referred to and then data is inputted (step 212). Upon completion of input of the data, the selection and editing device 34 is energized if it is not already busy, steps 213 and 214. This is a flow from step 210 to step 214 in FIG. 32.

Figure 34:
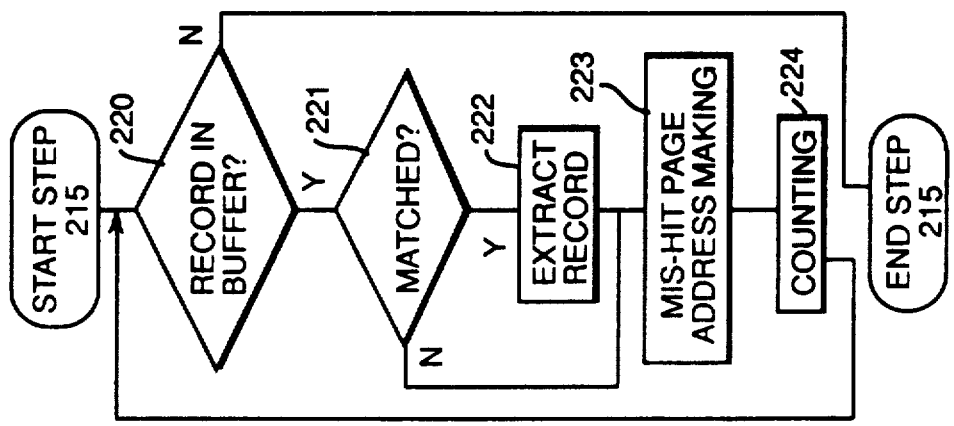
FIG. 34 is a flow chart of the step 215 of FIG. 33.
Figure 33:
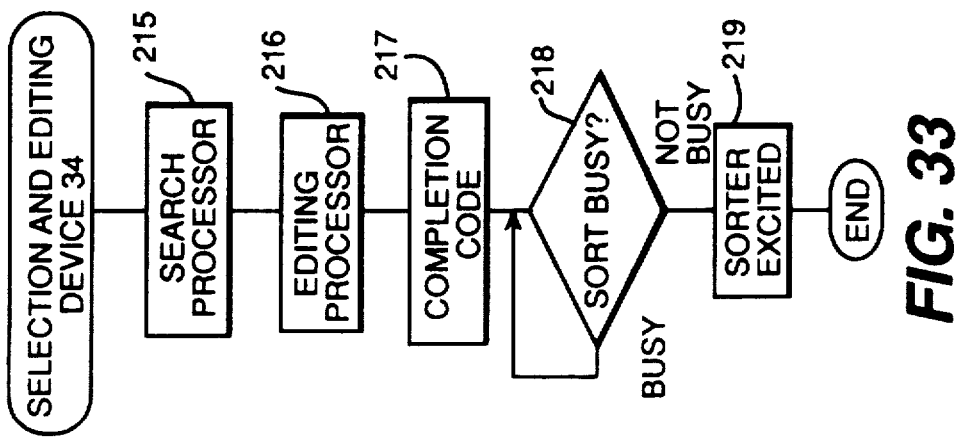
FIG. 33 is a flow chart of the selection and editing device control.

Then, as shown in FIG. 33, if an energization is set by the input device 35, the selection and editing device 34 at first transfers control to the search processor 34a (step 215), then it transfers control to the edit processor 34b (step 216) and lastly it transfers control to the completion code source control 34d (step 217). If this operation of the search and editing device 34 is completed, the search and editing device 34 checks if the sorter 33 is being energized or not, that is, is it already busy (step 218). If the sorter 33 is in its energized state, the search and edit device 34 waits until the sorter 33 completes its operation, otherwise it is energized (step 219). This is a flow from steps 215 to 219 in FIG. 33. In case that there is a record in the input buffer 38 (step 220 of FIG. 34), the search processor 34a inputs records one by one and checks if a condition of each record is matched with the search condition code 11b (step 221) and if matched, the search processor 34a extracts the matched record (step 222) and then outputs the matched record to the intermediate buffer 39 for making the mis-hit page address list (step 223) and counting the pages (step 224).

After this operation, control is transferred to the mis-hit page address list source control 34c. After operation of the his-hit page address list source control 34c, it transfers control to the counting information source control 34e. These processings are continued until a record is not present in the input buffer 38 and if there is no record, the processing is completed.

Figure 15:
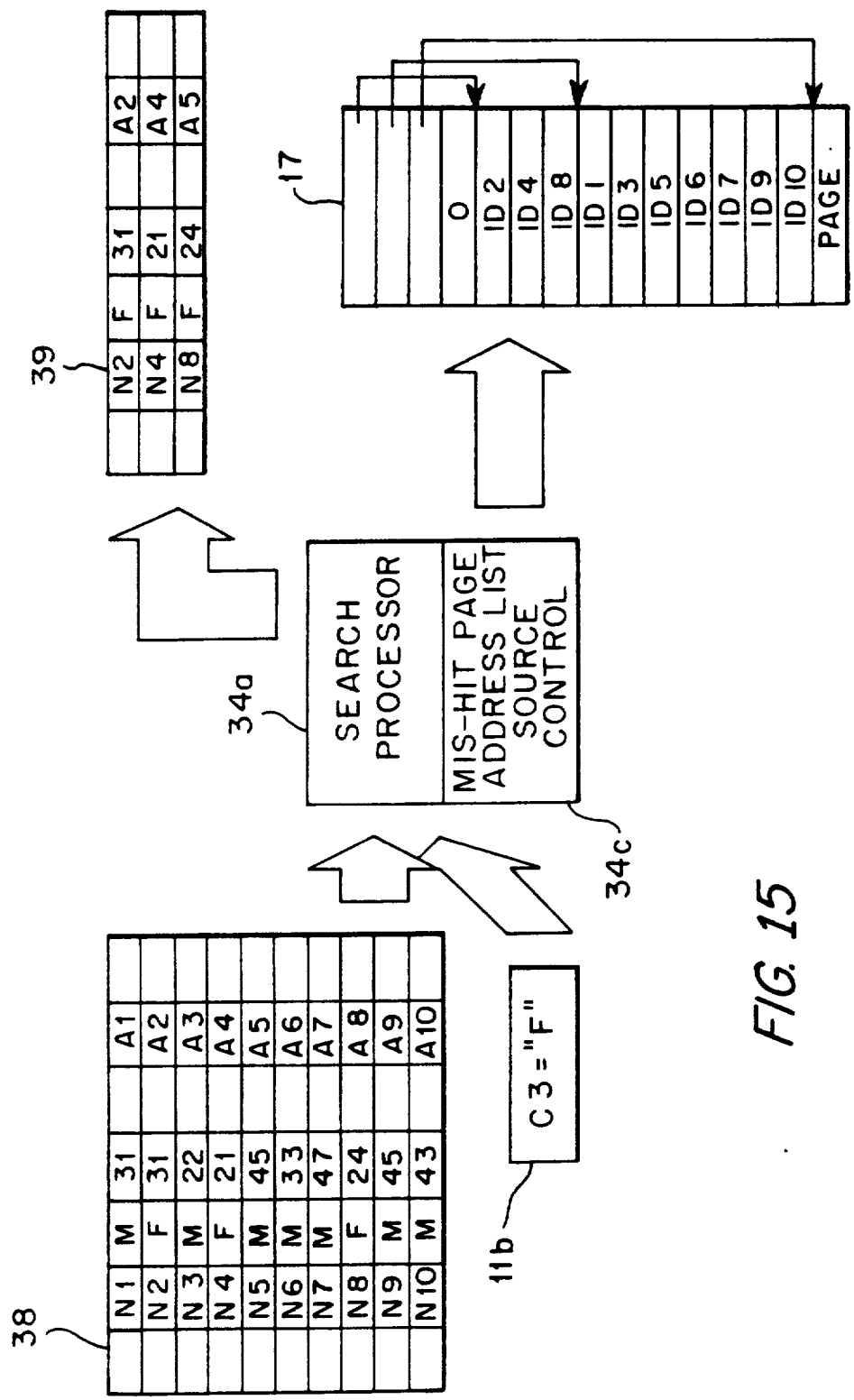
FIG. 15 illustrates a search processor and a mis-hit page address list source control.
Figure 16:
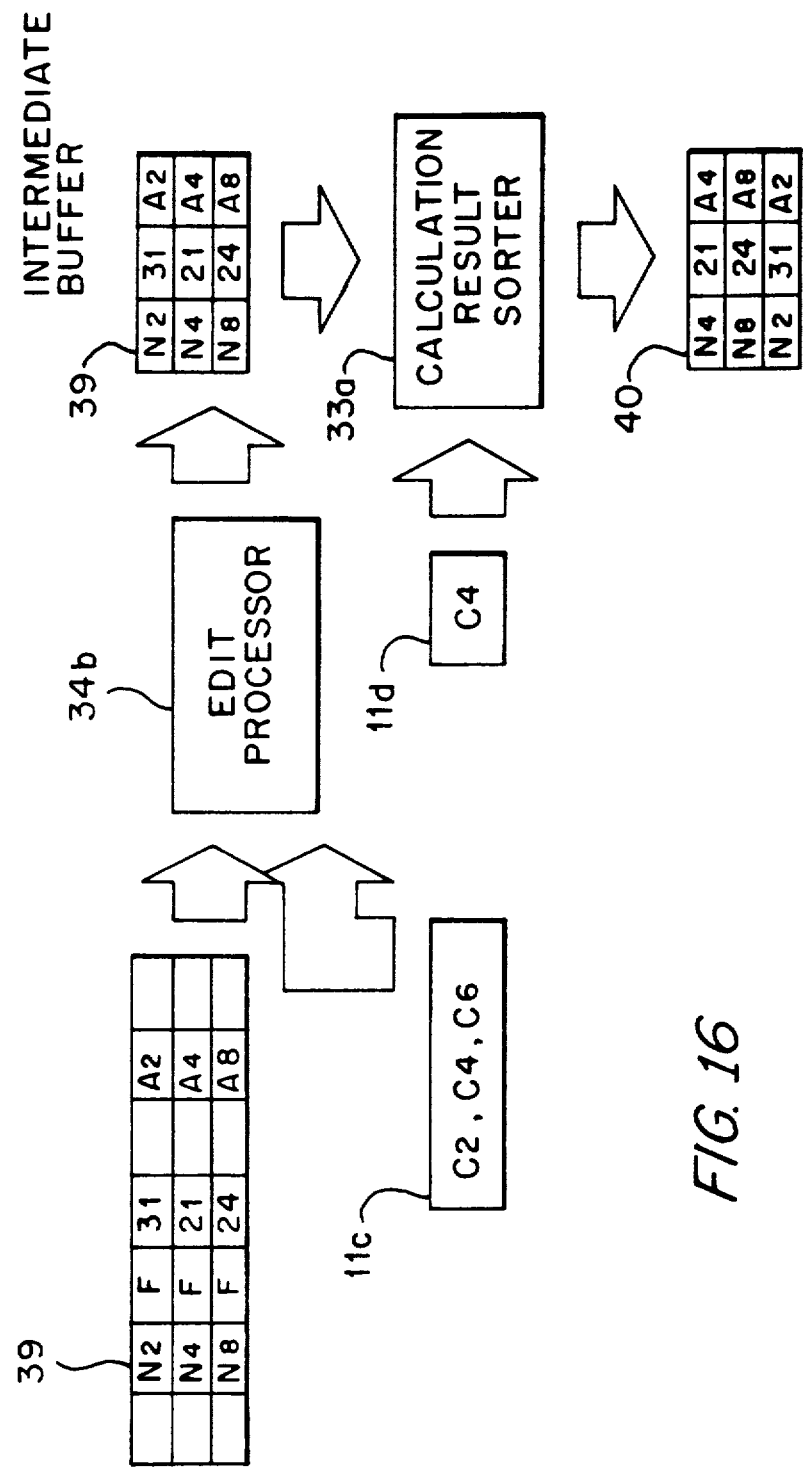
FIG. 16 shows a general processing of the edit processor.
Figure 35:
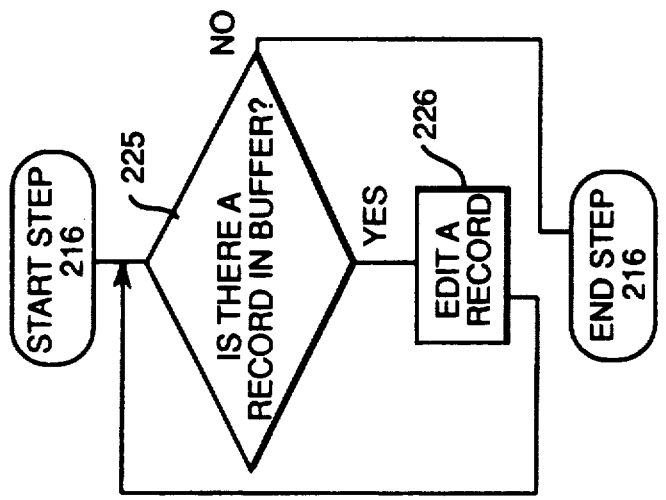
FIG. 35 is a flow chart of the step 216 of FIG. 33.

FIG. 15 illustrates a search processor 34a and a mis-hit page address list source control 34c. In this example, as an input page, the page number ID1 is inputted to the input buffer 38. This page has ten records N1 to N10 and as a search condition code 11b, the third column C3 is "F" and this condition is inputted to the search processor 34a. This is a flow of steps 220 to 224 in FIG. 34. The mis-hit page address list source control 34c accumulates the second, fourth and eighth record numbers (N2, N4, N8) as page numbers ID2, ID4 and ID8 to make up the mis-hit page address list 17 for a searching record. Further, it accumulates the first, third, fifth, sixth, seventh, ninth and tenth record numbers corresponding to ID1, ID3, ID5, ID6, ID7, ID9 and ID10 as the nonsearching record of the mis-hit page address list 17 and then accumulates the page number ID1 as the searching page of the mis-hit page address list 17. The edit processor 34b as shown in FIG. 16, if there is a record (step 225 of FIG. 35) extracts the records from the intermediate buffer 39 and edits the records in compliance with the editing condition code 11c (step 226). This operation is continued until there is no record in the intermediate buffer 39 (N in step 225) and if the record is not present, processing of the edit processor 34b will be finished (end of step 216). FIG. 16 shows a general processing of the edit processor 34b. In this example, three records are stored in the intermediate buffer 39 and the editing condition code 11c requires that the second, fourth and sixth columns must be extracted. This is a flow of steps 225 and 226 in FIG. 35.

Then, if the energization is set by the selection and editing device 34, transfer of control is to the calculation result sorter 33a. After this operation, if the output device 32 is in its energized state, it waits until the processing of the output device 32 is completed. If it is not being energized, the output device 32 is energized. The calculation result sorter 33a refers to the records searched and edited from the intermediate buffer 39 and the input sorting condition code 11d to thereby accumulate the sorting result in the output buffer 40. FIG. 16 also shows the general processing of the calculation result sorter 33a. In this example the intermediate buffer 39, the second, fourth and sixth columns of the records in the intermediate buffer 39 are searched and edited in the searching and editing operation and the sorting condition code 11d is used for sorting by the fourth column.

Lastly, the output device 32, if an energization from the sorter 33 is applied, transmits the data stored in the output buffer 40 to the data receiving buffer at the calculation device 2 asynchronously with the data receiving command. After this operation, if all the page address lists 25 are completely processed, or the buffer within the data processing device 3 overflows, or the buffer within the calculation device 2 overflows to generate a completion code, the output device 32 outputs the mis-hit page address list 17, the completion code and the counting information. With the foregoing method, the data access program 22 edits the access request from DBMS 21 against the data processing request and then calculates the input/output requests by using the data processing device 3.

While a preferred embodiment has been set forth along with modifications and variations to show specific advantageous details of the present invention, further embodiments, modifications and variations are contemplated within the broader aspects of the present invention, all as set forth by the spirit and scope of the following claims.

We claim:

1. An input/output processing method in a data processing system comprising a calculation device processing data records as input/output pages, recording media having a plurality of recording mediums and storing the data records, and a data processing device connected between the calculation device and the recording media, the method comprising the steps of:
   receiving, in the data processing device, a data request having a page address list describing data records to be retrieved and a search condition, describing a data group selected from the data records, from the calculation device;
   processing the data request by reading data records from the recording media in response to the page address list, and extracting the data group from the data records satisfying the search condition;
   providing a completion signal when said step of processing the data request is completed and providing a last accessed page address signal when said step of processing the data request is interrupted, and transmitting one of the signals, so provided, to the calculation device;
   managing a group of program codes describing input/output procedures for the data group according to various data formats of the data records as stored in the recording media and executing the program codes according to the data format for the data records in the recording media; and
   receiving data which satisfy the search condition from the data processing device.

2. A method according to claim 1, including, in the data processing device, the steps of receiving simultaneously a plurality of the requests and asynchronously performing said steps for each of the requests.

3. A method according to claim 2, including, in the calculation device the step of determining a priority order of the requests; and
   in the data processing device, the step of conducting said processing according to the priority order.

4. A method according to claim 3, including,
   in the data processing device, the steps of terminating a transmitting of data to the calculation device when a block buffer for receiving data transmitted from the data processing device is full in the calculation device;
   storing a result of said processing of the requests in a buffer of the data processing device and transmitting data in the buffer to the calculation device when the calculation device issues a data request; and
   in the calculation device, executing prefetch processing in response to a frequency of request for the data processing device.

5. A method according to claim 2, including,
   in the data processing device, the steps of terminating a transmitting of data to the calculation device when a block buffer for receiving data transmitted from the data processing device is full in the calculation device;
   storing a result of said processing of the requests in a buffer of the data processing device and transmitting data in the buffer to the calculation device when the calculation device issues a data request; and
   in the calculation device, executing prefetch processing in response to a frequency of request for the data processing device.

6. A method according to claim 1, including,
   in the calculation device, the steps of issuing input/output requests for each of the plurality of recording mediums in parallel;
   transmitting the input/output requests to the data processing device, and asynchronously processing each of the input/output requests; and
   collecting results of each of the input/output requests for each of the recording mediums and transmitting the results to the calculation device.

7. A method according to claim 1, including,
   in the calculation device, the steps of designating a block buffer for receiving a group of data blocks in response to the data request, before executing the request; further assigning a buffer for receiving the page address list for discriminating a group of data blocks which contain data satisfying the search condition, and releasing an unnecessary block of the buffer which does not contain said group of data blocks after completion of said processing.

8. A method according to claim 1, including,
   in the calculation device, the step of converting the page address list into a number device address list.

9. A method according to claim 8, including,
   in the calculation device, the steps of designating a block buffer for receiving a group of data blocks in response to the data request, before executing the request, further assigning a buffer for receiving the page address list for discriminating a group of data blocks which contain data satisfying the search condition, and releasing an unnecessary block of the buffer which does not contain said group of data blocks after completion of said processing.

10. A method according to claim 1, including the steps of;
    providing the data processing device with two modes of the requests, namely a block search mode for selectively outputting a block, which contains a record satisfying the search condition, to the block buffer and a data search mode for forming the data, which contain the record satisfying the search condition, in a block format and outputting it to the block buffer; and
    determining the mode according to the received data requests.

11. An input/output system comprising:
    a calculation device;
    recording media having a plurality of recording mediums;
    a data processing device positioned between said calculation device and said recording media;
    said data processing device having means for receiving a data calculation request having a page address list and a search condition and issuing input/output requests to the recording media; and
    said calculation device having an access program means for issuing data requests according to the format of the data.

12. A system according to claim 11, wherein a microprogram control transfers a program code for data requests to the data processing device according to the format of the data in the recording media.

13. A system according to claim 11, including a priority order deciding means for processing data requests.

14. A system according to claim 11, including parallel access means for issuing data requests for each recording medium and transferring these requests to the data processing device.

15. A system according to claim 11, including means for processing the data requests asynchronously.

16. A system according to claim 11, including means for collecting a result of the processing of the data request and transferring the result to the calculation device.

17. A system according to claim 11, including mode deciding means for judging between a page search mode and a data search mode from information within the received data request.

18. An input/output processing method in a data processing system comprising a calculation device processing records as input/output pages, recording medium storing the records, and a data processing device connected between the calculation device and the recording medium, the method comprising the steps of:

sending a data request having a page address list describing records to be retrieved, a search condition describing a data group selected from the records, and a data format information related to the data as stored in the recording medium, from said calculation device to said data processing device;

reading records of data from said recording medium in response to the page address list on the basis of said data format information, in said data processing device;

extracting, in said data processing device, the data group from the records of data satisfying the search condition;

sending said extracted data group from said data processing device to said calculation device.

19. A method according to claim 18, wherein said data format information includes a group of codes describing input/output procedure for the data group according to various data formats of the data as stored in the recording medium.